(12) United States Patent
Feke

(10) Patent No.: US 10,612,977 B2
(45) Date of Patent: Apr. 7, 2020

(54) GROUPED MOLECULAR ABSORPTION LINE WAVELENGTH CALIBRATION APPARATUS AND METHOD

(71) Applicant: The Charles Stark Draper Laboratory, Inc., Cambridge, MA (US)

(72) Inventor: Gilbert D. Feke, Windham, NH (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 85 days.

(21) Appl. No.: 16/038,759

(22) Filed: Jul. 18, 2018

(65) Prior Publication Data

US 2019/0025125 A1    Jan. 24, 2019

Related U.S. Application Data

(60) Provisional application No. 62/535,021, filed on Jul. 20, 2017.

(51) Int. Cl.
*G01J 3/44* (2006.01)
*G01C 19/72* (2006.01)
(Continued)

(52) U.S. Cl.
CPC . *G01J 3/44* (2013.01); *G01J 3/10* (2013.01); *G01J 3/28* (2013.01); *G02B 27/0972* (2013.01);
(Continued)

(58) Field of Classification Search
CPC ........ G01J 3/44; G01J 3/10; G01J 3/28; G01J 2003/2866; G02B 27/0972; G01C 19/721
See application file for complete search history.

(56) References Cited

U.S. PATENT DOCUMENTS 3,679,288 A    7/1972    Harris
4,272,825 A    6/1981    Smithline et al.
(Continued)

OTHER PUBLICATIONS

"C-Band Wavelength Calibrator Hydrogen Cyanide Gas Cell H13-C14N ," Wavelength References, consisting of 2 pages. Downloaded from http://www.wavelengthreferences.com/pdf/Data%20HCN.pdf on Jun. 13, 2018.
(Continued)

*Primary Examiner* — Jamil Ahmed
(74) *Attorney, Agent, or Firm* — Hamilton, Brook, Smith & Reynolds, P.C.

(57) ABSTRACT

A wavelength calibration apparatus includes a light source configured to deliver a backlight beam characterized by a backlight spectrum. The apparatus includes a gas reference cell configured to absorb light from the backlight beam and transmit an imprinted light beam characterized by an imprinted light spectrum. The apparatus further includes a spectrometer configured to (i) receive the transmitted imprinted light beam from the gas reference cell and to apply a plurality of reference spectral selection factors to spectrally resolve the imprinted light beam into reference indicia groups, (ii) detect a plurality of reference spectral power readings, and (iii) deliver a reference dataset for associating the reference spectral power readings with the reference spectral selection factors. A wavelength calibrator of the apparatus determines a wavelength calibration factor based on a difference between the reference dataset and a standard dataset. A wavelength-corrective light source includes the calibration apparatus.

48 Claims, 30 Drawing Sheets

(51) Int. Cl.
*G01J 3/10* (2006.01)
*G02B 27/09* (2006.01)
*G01J 3/28* (2006.01)

(52) U.S. Cl.
CPC .... *G01C 19/721* (2013.01); *G01J 2003/2866* (2013.01)

(56) References Cited

U.S. PATENT DOCUMENTS

| | | | |
|---|---|---|---|
| 4,410,275 | A | 10/1983 | Shaw et al. |
| 4,422,154 | A | 12/1983 | Smithline et al. |
| 4,529,312 | A | 7/1985 | Pavlath et al. |
| 4,637,025 | A | 1/1987 | Snitzer et al. |
| 4,637,722 | A | 1/1987 | Kim |
| 4,671,658 | A | 6/1987 | Shaw et al. |
| 4,687,330 | A | 8/1987 | Lefevre |
| 4,836,676 | A | 6/1989 | Kim et al. |
| 5,108,183 | A | 4/1992 | Fling et al. |
| 5,231,465 | A | 7/1993 | Huang et al. |
| 5,828,061 | A | 10/1998 | Kakimoto |
| 6,108,086 | A | 8/2000 | Michal et al. |
| 6,249,343 | B1 | 6/2001 | Wang et al. |
| 8,005,332 | B2 | 8/2011 | Schmidt et al. |
| 8,079,763 | B2 | 12/2011 | Benabid |
| 8,385,693 | B2 | 2/2013 | Schmidt et al. |
| 8,588,557 | B2 | 11/2013 | Schmidt et al. |
| 2007/0041075 | A1* | 2/2007 | Gupta ............ G01J 3/02 359/285 |
| 2017/0123147 | A1 | 5/2017 | Brown et al. |

OTHER PUBLICATIONS

"1100-2200nm Quasi-Collinear Acousto-Optic Tunable Filter," TF1650-1100-2-3-GH40 [www.goochandhousego.com] C&H Enabling Photonic Technologies, pp. 1-3. Downloaded on Jun. 13, 2018.

"C-Band Wavelength Calibrator Acetylene Gas Cell 12C2H2," Wavelength References, consisting of 2 pages. Downloaded from http://www.wavelengthreferences.com/pdf/Data%20C2H2.pdf on Jun. 13, 2018.

"Typical Performance," Exalos AG Switzerland [www.exalos.com], consisting of 1 page. Downloaded on Jun. 13, 2018.

Gilbert, et al., "Acetylene 12C2H2 Absorption Reference for 1510 nm to 1540 nm Wavelength Calibration—SRM 2517a," NIST Special Publication 260-133 (2001).

Gilbert, et al., "Carbon Monoxide Absorption References for 1560 nm to 1630 nm Wavelength Calibration—SRM 2514 (12C16O) and SRM 2515 (13C16O)," NIST Special Publication 260-146 (2002).

Gilbert, et al., "Hydrogen Cyanide H13C14N Absorption Reference for 1530 nm to 1565 nm Wavelength Calibration—SRM 2519a," NIST Special Publication 260-137 (2005).

Hall, D. C. et al., "High-stability Er3+-Doped Superfluorescent Fiber Sources," J. Lightwave Tech., vol. 13, No. 7, pp. 1452-1460 (Jul. 1995).

LeFevre, H.C., The Fiber Optic Gyroscope, 2nd Edition, Boston: Artech House (2014).

Mantsevich, et al., "Examination of the temperature influence on the acousto-optic filters performance," Optics and Spectroscopy 122.4; 675-681 (2017) (Abstract only).

Trivedi, et al., "Space qualification issues in acousto optic tunable filter (AOTF) based spectrometers," Lasers and Applications in Science and Engineering, International Society for Optics and Photonics (2006) (Abstract only).

* cited by examiner

| Percentage of Radiation Dose | Mean Emitter Wavelength $\lambda_m$ | Compensation Factor ($\lambda_m/\lambda_{m,0}$) |
|---|---|---|
| 0% | 1557.54 nm ($\lambda_{m,0}$) | 1 |
| 12.5% | 1557.05 nm | 0.999685 |
| 25% | 1557.00 nm | 0.999653 |
| 50% | 1556.33 nm | 0.999223 |
| 100% | 1555.26 nm | 0.998536 |

GROUPED MOLECULAR ABSORPTION LINE WAVELENGTH CALIBRATION APPARATUS AND METHOD

RELATED APPLICATION

This application claims the benefit of U.S. Provisional Application No. 62/535,021, filed on Jul. 20, 2017. The entire teachings of the above application are incorporated herein by reference.

FIELD

This disclosure relates generally to wavelength calibration and more particularly to a grouped molecular absorption line wavelength calibration apparatus and method.

BACKGROUND

Known devices for measuring the wavelength of optical signals, such as spectrometers, typically contain a combination of optical, mechanical, and electronic components. The spectral operational sensitivity of these components to changes in environmental conditions, such as temperature or ionizing radiation, necessitates calibration to ensure measurement accuracy. One type of calibration reference known in the art is a cell filled with a gas having narrowband molecular absorption lines being known wavelengths. When a broadband light source is used in connection with the gas cell to see the narrowband absorption lines, spectrometers may be used to distinguish between narrowband absorption lines of the gas cell for calibration purposes. Spectral monitor arrays, acousto-optic tunable filters (AOTFs), and monochromatic light sources have also been used for calibration purposes.

SUMMARY

Known spectrometer-based calibration methods that are capable of resolving individual narrowband molecular absorption lines are typically too large, heavy, and expensive for certain sensor applications, such as fiber optic gyroscopes (FOGs). Spectrometers are also susceptible to measurement errors due to variable degradation among photodetector array elements that cannot be corrected by gas-cell-based calibration. Reliability may also be compromised by failure of any one of the many photodetector elements typically used. While acousto-optic tunable filters (AOTFs) provide some advantages of spectroscopic elements such as diffraction gratings and filter arrays, AOTFs have limited resolution and can be sensitive to temperature and ionizing radiation. Furthermore, calibration of AOTFs using a monochromatic light source adds impractical size, weight, and expense for many applications and precludes coverage of multiple reference wavelengths. Sealed cells with narrowband absorption at a single reference wavelength, like monochromatic light sources, limit calibration of AOTFs to a single reference wavelength.

Applicants have recognized a need for an improved molecular absorption line wavelength calibration apparatus and method. Applicants have further recognized a need for an improved wavelength-corrective light source apparatus and method. Applicants have further recognized a need for an improved FOG apparatus and method.

Accordingly, described herein are a grouped molecular absorption line wavelength calibration apparatus and method, and further a wavelength-corrective light source apparatus and method.

In one embodiment, wavelength calibration apparatus, such as a grouped molecular absorption line wavelength calibration apparatus, and corresponding method, includes at least one gas reference cell. The calibration apparatus also includes a backlight source. The backlight source is configured to deliver a backlight beam into the at least one gas reference cell. The backlight beam is characterized by a backlight spectrum. The at least one gas reference cell is configured to absorb light from the backlight beam via a plurality of narrowband absorption lines of the gas reference cell, the narrowband absorption lines being known, well-defined wavelengths within the backlight spectrum. The at least one gas reference cell is further configured to transmit an imprinted light beam characterized by an imprinted light spectrum having a corresponding plurality of reference indicia imprinted thereto.

The calibration apparatus also includes a calibration spectrometer. The at least one gas reference cell is configured to deliver the transmitted imprinted light beam to the spectrometer. The calibration spectrometer is configured to apply a plurality of reference spectral selection factors to spectrally resolve the imprinted light beam for grouping spectrally adjacent reference indicia within the plurality of reference indicia into a plurality of reference indicia groups. Each reference indicia group corresponds to a respective spectral selection factor. The calibration spectrometer is further configured to detect a plurality of reference spectral power readings from the spectrally resolved imprinted light beam. Respective power readings of the plurality of reference spectral power readings correspond to respective selection factors of the plurality of reference spectral selection factors. The calibration spectrometer is still further configured to deliver a reference dataset for associating the reference spectral power readings with the reference spectral selection factors.

The calibration apparatus also includes a wavelength calibrator. The wavelength calibrator is configured to determine a wavelength calibration factor based on a difference between the reference dataset and a standard dataset. This difference may be a function of a difference between the correspondence of the plurality of reference indicia groups and a correspondence of a plurality of standard indicia groups to a plurality of standard spectral selection factors.

The backlight source may include an emitter that is at least one of a superluminescent diode (SLD), a rare-earth-doped superluminescent source (REDSLS), a light emitting diode (LED), or a supercontinuum fiber. The backlight source may further include a flattening filter configured to receive an unconditioned light beam characterized by an unconditioned spectrum from the emitter, to flatten the unconditioned spectrum, and to transmit the backlight beam.

The backlight beam may be delivered from the backlight source to the gas reference cell by at least one of a free space mechanism, a fiber optic mechanism, or a combination thereof. The free space mechanism may use lens coupling. A fiber optic mechanism may use fiber pigtailing.

The at least one gas reference cell may include at least one of a tube, a hollow optical fiber, and an integrated waveguide coupled chamber.

The at least one gas reference cell may be filled with at least one gas. The at least one gas may include at least one of acetylene, hydrogen cyanide, carbon monoxide having carbon 12 isotope, carbon monoxide having carbon 13 isotope, hydrogen fluoride, water vapor, methane, ammonia, hydrogen chloride, carbon dioxide, hydrogen sulphide, nitrogen, argon, and nitrogen dioxide. The at least one gas reference cell may be filled with a mixture of different gases.

Alternatively, the calibration apparatus may include a plurality of gas reference cells, each cell filled with a different gas. The gas reference cells of the plurality may be optically coupled together, such as by a free space mechanism, a fiber optic mechanism, or a combination thereof, such that the imprinted light beam results from the combination of a plurality of constituent imprinted light beams corresponding to the plurality of gas reference cells.

The imprinted light beam may be delivered from the gas reference cell, or the plurality of gas reference cells, to the spectrometer by at least one of a free space mechanism, a fiber optic mechanism, or a combination thereof. The free space mechanism may use lens coupling. A fiber optic mechanism may use fiber pigtailing.

The calibration spectrometer may include a spectrometric photodetector. The spectrometric photodetector may include at least one photodiode. The calibration spectrometer may further include at least one acousto-optic tunable filter (AOTF) having a tuning relation that relates AOTF drive frequencies to peak transmission wavelengths output therefrom, and further having a spectral resolution. The tuning relation may have a tuning relation operational sensitivity. The tuning relation operational sensitivity may include at least one of a tuning relation thermal sensitivity and a tuning relation ionizing radiation sensitivity. The at least one AOTF may be configured to receive the imprinted light beam. The at least one AOTF may be optically coupled to the at least one photodiode, such as by a free space mechanism, a fiber optic mechanism, or a combination thereof.

The plurality of spectral selection factors may include a plurality of AOTF drive frequencies. The AOTF drive frequencies of the plurality may be applied to the AOTF via a swept drive sequence across a frequency range. Alternatively, the AOTF drive frequencies of the plurality may be applied to the AOTF via an arbitrary or random sequence. The combination of the spectral resolution of the AOTF and the plurality of AOTF drive frequencies determines the plurality of reference indicia groups.

Alternatively, the spectrometric photodetector may include a plurality of photodiodes upon which the imprinted light beam is spectrally distributed. The plurality of photodiodes may be a photodiode array and the imprinted light beam may be spectrally distributed by a dispersive element, such as a diffraction grating or prism, whereby the plurality of spectral selection factors may include a plurality of dispersion angles and the combination of a pitch of the photodiode array and an angular dispersion of the dispersive element determines the plurality of reference indicia groups. Alternatively, the imprinted light beam may be spectrally distributed by a plurality of bandpass filters, whereby each bandpass filter is in optical communication with a respective photodiode of the plurality, and whereby the plurality of spectral selection factors may include a plurality of filter passbands and the plurality of filter passbands determines the plurality of reference indicia groups.

The wavelength calibrator may include at least one of a microprocessor, an application-specific integrated circuit (ASIC), and a field-programmable gate array (FPGA).

A wavelength-corrective light source and corresponding method may include the wavelength calibration apparatus described above; an emitter configured to emit an emitter light beam characterized by an emitter wavelength spectrum having an emitter centroid wavelength with an emitter centroid wavelength operational sensitivity; an emission spectrometer including at least one acousto-optic tunable filter (AOTF) configured to receive the emitter light beam and to output a transmitted light beam therefrom, the emission spectrometer further including a spectrometric photodetector having at least one photodiode configured to receive the transmitted light beam and to measure a plurality of powers of the transmitted light beam corresponding to respective AOTF drive frequencies; and an emitter centroid wavelength correction circuit configured to act on the plurality of powers of the transmitted light beam to correct for the emitter centroid wavelength operational sensitivity.

The emitter may be a broadband light source including at least one of an SLD, an REDSLS, an LED, and a supercontinuum fiber, and the wavelength spectrum may have a FWHM bandwidth of about 5 nm or greater.

The emitter centroid wavelength operational sensitivity may include at least one of an emitter centroid wavelength thermal sensitivity, an emitter centroid wavelength drive current sensitivity, and an emitter centroid wavelength ionizing radiation sensitivity.

The at least one AOTF may be optically coupled to the at least one photodiode such as by a free space mechanism, a fiber optic mechanism, or a combination thereof. The spectrometer may be configured to apply a plurality of emitter spectral selection factors, that include a plurality of AOTF drive frequencies, to spectrally resolve the emitter light beam. The AOTF drive frequencies of the plurality may be applied to the AOTF via a swept drive sequence across a frequency range. Alternatively, the AOTF drive frequencies of the plurality may be applied to the AOTF via an arbitrary or random sequence. The detected, measured plurality of emitter spectral power readings of the transmitted light beam corresponding to respective AOTF drive frequencies may also correspond to the plurality of emitter spectral selection factors.

The spectrometer may be further configured to deliver an emitter dataset for associating the emitter spectral power readings with the emitter spectral selection factors. The wavelength-corrective light source further includes an emitter centroid wavelength correction circuit configured to correct for the emitter centroid wavelength operational sensitivity. The correction may be either by compensating for the emitter centroid wavelength operational sensitivity or by controlling the emitter centroid wavelength.

The spectrometer of the wavelength-corrective light source may also be the spectrometer of the calibration apparatus. The wavelength-corrective light source may further include a router. The router may be configured to selectively deliver the emitter light beam and the imprinted light beam to the spectrometer. The emitter wavelength correction circuit may be further configured to receive and apply the calibration factor to calibrate the plurality of emitter spectral selection factors relative to the plurality of optical wavelengths.

In another embodiment, a fiber-optic gyroscope (FOG) is configured to include the wavelength-corrective light source, in any of its variations, as described hereinabove. The FOG may include at least one of a coil of optical fiber, a rate detector, and a phase modulator coupler optical circuit configured to phase modulate the emitter light from the light source and to couple the emitter light from the light source into the coil of optical fiber and further into the at least one rate photodetector.

The FOG may further include at least one relative intensity noise (RIN) photodetector. The emission spectrometer of the wavelength-corrective light source may also be the calibration spectrometer of the wavelength calibration apparatus. The FOG may further include at least one of a rate photodetector, wherein the phase modulator coupler optical circuit is further configured to couple the emitter light from the coil of optical fiber into the at least one rate photodetector.

In a further embodiment, a wavelength-corrective light source and corresponding method includes an emitter configured to emit an emitter light beam characterized by an emitter wavelength spectrum having an emitter centroid wavelength with an emitter centroid wavelength operational sensitivity. The wavelength-corrective light source further includes an emission spectrometer including at least one acousto-optic tunable filter (AOTF) configured to receive the emitter light beam and to output a transmitted light beam therefrom, the emission spectrometer further including a spectrometric photodetector having at least one photodiode configured to receive the transmitted light beam and to measure a plurality of powers of the transmitted light beam corresponding to respective AOTF drive frequencies. The wavelength-corrective light source also includes an emitter centroid wavelength correction circuit configured to act on the plurality of powers of the transmitted light beam to correct for the emitter centroid wavelength operational sensitivity.

In yet another embodiment, a method of performing grouped molecular absorption line wavelength calibration includes providing at least one gas reference cell, providing a backlight source, providing a spectrometer, providing a wavelength calibrator, and determining a calibration factor.

In yet another embodiment, a method for correcting the centroid wavelength of light from an emitter light source includes providing an emitter light source whose light is characterized by a wavelength spectrum having an emitter centroid wavelength, and further characterized by an emitter centroid wavelength operational sensitivity. The method also includes providing a spectrometer. The method also includes providing a centroid wavelength correction member. The method also includes correcting the emitter centroid wavelength of the light against the centroid wavelength operational sensitivity using the spectrometer. The method may further include performing grouped molecular absorption line wavelength calibration, as described hereinabove, to calibrate the spectrometer.

In yet another embodiment, a method of optimizing a FOG includes applying the emitter light from any embodiment wavelength-corrective light source apparatus described hereinabove. The method also includes phase modulating the light and optically coupling the light into a coil of optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

For a fuller understanding of the nature and objects of the disclosed embodiments, reference should be made to the following detailed description, taken in connection with the accompanying drawings, in which:

FIG. 15B is a table of compensation factors derived from the spectra of FIG. 15A;

Figure 1:
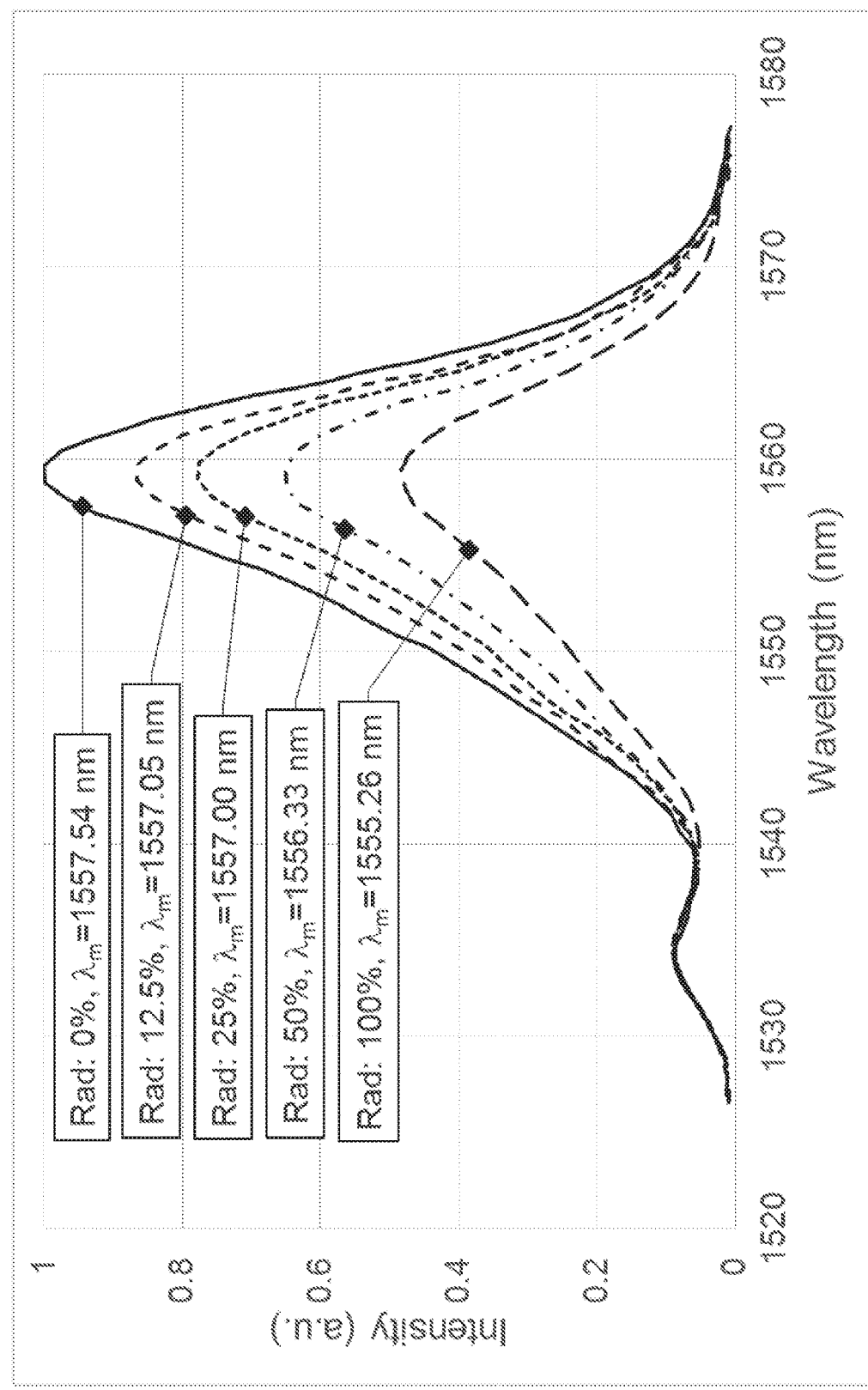
FIG. 1 shows exemplary spectra of a REDSLS illustrating the effects of ionizing radiation over a continuum of radiation levels.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figures shown and described herein are provided in order to illustrate key principles of operation and component relationships along their respective optical paths according to the present disclosure and are not drawn with intent to show actual size or scale. Some exaggeration may be necessary in order to emphasize basic structural relationships or principles of operations.

Spectrometers, which measure optical wavelengths, usually include optical, mechanical, and electronic components that are sensitive to changes in environmental conditions. Temperature and incident ionizing radiation, for example, can affect measurement accuracy, so calibration of a spectrometer is often required to ensure accuracy. One type of calibration reference known in the art is a cell filled with a gas having narrowband molecular absorption lines being known wavelengths. When a broadband light source is used in connection with the gas cell to see the narrowband absorption lines, spectrometers may be used to distinguish between narrowband absorption lines of the gas cell for calibration purposes. Spectral monitor arrays, acousto-optic tunable filters (AOTFs), and monochromatic light sources have also been used for calibration purposes.

Calibration references are known that provide a plurality of accurate, known wavelength indicia, in the form of a plurality of multiple narrowband absorption or emission lines, that may be used to calibrate certain wavelength measuring devices capable of resolving the individual lines of the plurality. To be effective, the calibration reference must provide these known wavelength indicia with accuracy and stability. One type of calibration reference known in the art is a cell filled with at least one gas having a plurality of molecular absorption lines whose wavelengths are known. When coupled to a broadband light source, the gas in the cell provides a plurality of absorption lines which are very stable against environmental changes. Example gas reference cells are commercially available from Wavelength References, Corvallis, Oreg., for example.

In certain known applications, optical signals are produced by broadband light sources. For example, known light sources with full width at half maximum (FWHM) bandwidth of about 5 nm or greater, including superluminescent diodes (SLDs), rare-earth-doped superluminescent sources (REDSLSs), light emitting diodes (LEDs), and supercontinuum fiber have been used. Such broadband light sources are useful in sensor applications, particularly applications related to interferometry to avoid coherence noise effects. Many such sensor applications for light sources may benefit from centroid wavelength correction derived from wavelength measurements, for example compensation of the sensor to correct for fluctuations of the centroid wavelength of the wavelength spectrum provided by the light source due to a centroid wavelength operational sensitivity, for example centroid wavelength thermal sensitivity that causes the centroid wavelength to fluctuate due to fluctuation of the temperature of the light source, or centroid wavelength drive current sensitivity that causes the centroid wavelength to fluctuate due to fluctuation of the drive current applied to the light source, or centroid wavelength sensitivity to ionizing radiation; or active control, or stabilization, of the centroid wavelength of the wavelength spectrum provided by the light source to counteract a centroid wavelength operational sensitivity.

For example, fiber optic gyroscopes (FOGs) are known sensors that use the interference of source light from a light source to measure angular velocity. Rotation is sensed in a FOG with a large coil of optical fiber forming a Sagnac interferometer. An induced phase shift between the counter-propagating light waves injected in the sensor coil is proportional to the rotation rate and is measured by means of a photodetector. The proportionality constant, called "scale factor," is given by $2\pi LD/\bar{\lambda}c$, where L is the length of the fiber coil, D is the diameter of the fiber coil, c is the speed of light in vacuum, and $\lambda_m$ is the centroid wavelength of the light waves propagating in the coil. The centroid wavelength $\bar{\lambda}$ is defined by:

$$\bar{\lambda} = \frac{\int \lambda P(\lambda) d\lambda}{\int P(\lambda) d\lambda}$$

where $\lambda$ is the wavelength of the spectral components of the light waves, and $P(\lambda)$ is the optical power as a function of $\lambda$, that is, the spectral distribution of the light waves. Hence the accuracy of the gyroscope is limited by the accuracy by which $\bar{\lambda}$ of the light source is known. In particular, for FOGs to be useful in certain navigation applications, $\bar{\lambda}$ must be accurate to 10 parts per million (ppm) or better over a range of temperature $\Delta T$ of that can span up to 10° C. or more, that is $$\frac{1 \Delta \bar{\lambda}}{\bar{\lambda} \Delta T} = \frac{1}{\bar{\lambda}} \alpha < 10^{-6} \frac{1}{°\text{C.}}$$

where the centroid wavelength thermal sensitivity is defined as $\alpha \equiv \Delta \bar{\lambda}/\Delta T$. Centroid wavelength correction is advantageous to achieve such accuracy.

Broadband light sources are particularly advantageous for introducing the light into the sensor coil because phase coherent noise effects due to backscattering noise and polarization coupling are suppressed, the relative intensity noise (RIN) of the FOG decreases with increasing bandwidth, and the zero-rotation drift induced through the Kerr effect by relative variations in the two counterpropagating optical powers is reduced. Such effects would otherwise cause significant reduction in rotation sensitivity and accuracy. REDSLSs, such as erbium-doped fiber amplifiers, have tended to find application in FOGs.

It has been shown that changes in the REDSLS of a FOG (and, to a lesser degree, the other fiber optic components, such as the sensor coil) induced by exposure to harsh environments, such as ionizing radiation, can cause large shifts in the centroid wavelength, resulting in large scale factor errors.

FIG. 1 illustrates the effects of ionizing radiation on the spectrum of an REDSLS over a continuum of levels of ionizing radiation. A typical spectrum for the REDSLS before exposure to ionizing radiation is represented by the graph at 0% radiation. Full exposure to a predetermined dose of ionizing radiation is represented by the graph at 100% radiation, whereas the remaining graphs show the spectra of the REDSLS at doses of ionizing radiation which are fractional amounts of the 100% dose. As can be seen, the relative intensity of the REDSLS light source decreases with respect to the pre-exposure spectrum. Furthermore, the shape of the spectrum of the REDSLS changes as the total dose of ionizing radiation increases, and hence the centroid wavelength $\bar{\lambda}$ changes as indicated. The 100% dose of ionizing radiation results in an approximately (1557.54 nm–1555.26 nm)/(1557.54 nm)=0.001464 shift, or 1464 ppm shift, in the centroid wavelength relative to the pre-exposure spectrum.

The spectrum from a broadband light source is made up of a composite of several emission peaks. As the radiation damages the REDSLS, the different emission peaks experience different levels of attenuation. This has the effect of shifting the centroid wavelength. The shift in the centroid wavelength can correspond to a scale factor shift over 1000 ppm. For fiber optic gyroscopes used in applications requiring a high degree of accuracy, this creates an unacceptable level of error.

In addition to FOGs, other optical sensors and measuring devices as known in the art, such as accelerometers, pressure sensors, strain sensors, temperature sensors, profilometers, fiber optic link test equipment, and optical coherence tomography systems, provide applications for which light sources enjoy utility and whereby the accuracy of the centroid wavelength is critical to performance.

The wavelength spectrum emitted by broadband light sources used in sensor applications can fall within the range of 1510 nm to 1630 nm, especially due to the commercial availability of optical components having utility in this range. Gases whose lines cover this range include acetylene, which provides a plurality of narrowband lines having wavelengths from 1510 nm to 1540 nm; hydrogen cyanide, which provides a plurality of narrowband lines having wavelengths from 1530 nm to 1565 nm; carbon monoxide having carbon 12 isotope, which provides a plurality of narrowband lines having wavelengths from 1560 nm to 1595 nm; and carbon monoxide having carbon 13 isotope, which provides a plurality of narrowband lines having wavelengths from 1595 nm to 1630 nm. Other known gases provide pluralities of narrowband lines over other ranges that may be useful for certain other broadband light sources: for example hydrogen fluoride, which provides a plurality of narrowband lines having wavelengths from 1260 nm to 1330 nm; and water vapor, which provides a plurality of narrowband lines having wavelengths from 1330 nm to 1480 nm. In addition, methane, ammonia, hydrogen chloride, carbon dioxide, hydrogen sulphide, nitrogen, argon, and nitrogen dioxide are known to be useful gases for gas reference cells.

The separation between the individual acetylene narrowband lines of the plurality ranges from 0.3 nm to 0.7 nm, and the separation between the individual hydrogen cyanide narrowband lines of the plurality ranges from 0.3 nm to 0.9 nm. Certain types of spectrometers, such as known spectrometers comprising a dispersive element such as a diffraction grating and photodetector array, provide resolution of about 0.3 nm or better and are, hence, capable of calibration by resolving the individual acetylene or hydrogen cyanide narrowband lines of the respective pluralities. However, such spectrometers are typically too large, heavy, and expensive for certain sensor applications such as FOGs. Furthermore, such spectrometers are susceptible to measurement errors due to variable degradation among the photodetector array elements, especially due to exposure to ionizing radiation, that cannot be corrected by calibration using a gas cell reference. Such spectrometers may further have compromised reliability, because a failure of any one of the many photodetector elements causes a failure of the entire array.

A system and method of stabilizing the scale factor shift in fiber optic gyroscopes using a spectral monitor array is known. In this known system, the spectral monitor array includes a plurality of bandpass filters, whereby each bandpass filter is connected to a respective photodetector for measuring the intensity of the signals transmitted by the bandpass filters. The intensity coming from each of the bandpass filters is then monitored and analyzed to determine whether a shift in the scale factor of the broadband light source has occurred. Any detected scale factor shift measured from the outputs of the bandpass filters is then used in a compensation algorithm to correct the scale factor of the optical signal. By monitoring the scale factor shift and adjusting the values measured by the gyro photodetector in accordance with the detected scale factor shift, the accuracy of the FOG can be improved. However, the spectral monitor array is susceptible to measurement errors due to variable degradation among the photodetector array elements, especially due to exposure to ionizing radiation, that cannot be corrected by calibration using a gas cell reference. Also, the spectral monitor array has compromised reliability because a failure of any one of the many photodetector elements causes a failure of the entire array. Further, the spectral monitor array is inefficient, because each bandpass filter rejects light that is outside of its passband, and that rejected light is wasted.

Acousto-optic tunable filters (AOTFs) are known. An AOTF includes a birefringent crystal having an acoustic transducer bonded to one face. Broadband light radiation passing through the crystal can be diffracted into specific wavelengths by application of a radio-frequency driving signal to the acoustic transducer according to the tuning relation specific to the particular AOTF. AOTFs are known to be used in spectrometers, whereby the radio-frequency driving signal is swept to enable a sequence of wavelength-resolved measurements of optical signals using a single photodetector. The AOTF has several advantages over alternative spectroscopic techniques such as diffraction gratings and filter arrays: namely, the AOTF is small, fast, reliable and has no moving parts.

The spectral resolution provided by AOTFs, however, is determined by the interaction length within the crystal and also the crystallographic orientation and is typically limited to between 1 nm and 15 nm. This spectral resolution is insufficient for resolving individual narrowband lines from acetylene and hydrogen cyanide reference cells. Furthermore, the tuning relation of AOTFs is known to be sensitive to temperature and ionizing radiation, thus necessitating calibration for certain applications.

A monochromatic light source for providing a single reference wavelength indicium for calibrating the AOTF is also known. However, this is impractical to apply in many sensor applications because of the large size, weight, and expense of such monochromatic sources. Furthermore, the limited coverage of the reference wavelength provided thereby is problematic with respect to the range of wavelengths of the optical signals produced by the broadband sources that require measurement.

A sealed cell containing a medium that exhibits narrowband absorption of light at a single, well known spectral location for providing a single reference wavelength indicium for calibrating the AOTF is also known. However, the limited coverage of the reference wavelength is problematic with respect to the range of wavelengths of the optical signals produced by the broadband sources that require measurement.

Figure 2:
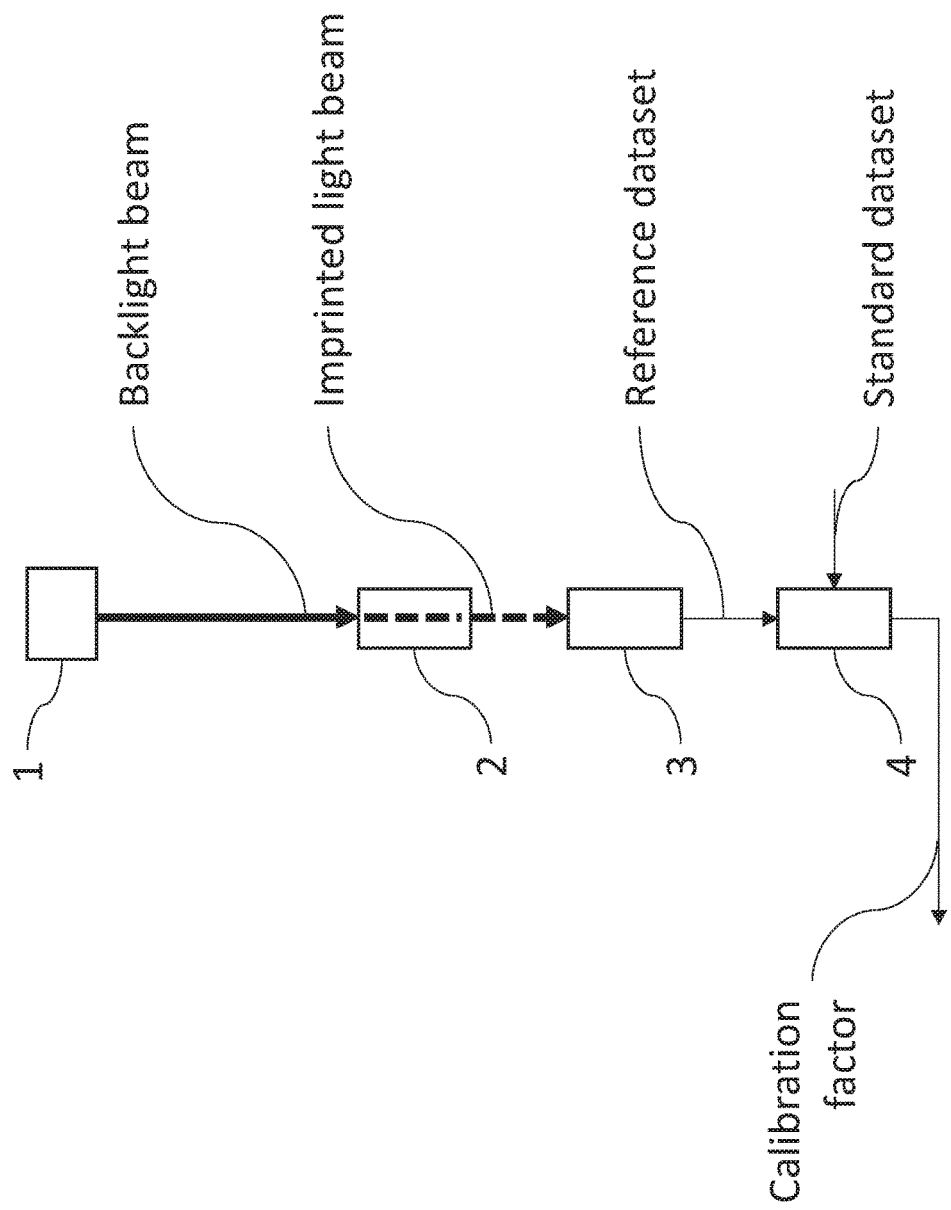
FIG. 2 is a schematic diagram of an embodiment of a grouped molecular absorption line wavelength calibration apparatus comprising a backlight source, a gas reference cell, a spectrometer, and a wavelength calibrator.

FIG. 2 is a schematic diagram of an embodiment grouped molecular absorption line wavelength calibration apparatus 100 that provides significant advantages over known calibration methods. The embodiment apparatus 100 comprises a backlight source 1, a gas reference cell 2, a calibration spectrometer 3, and a wavelength calibrator 4. Backlight source 1 is configured to deliver a backlight beam into gas reference cell 2. The backlight beam is characterized by a backlight spectrum. The backlight beam may be delivered from backlight source 1 to gas reference cell 2 by at least one of a free space mechanism, a fiber optic mechanism, or a combination thereof. The free space mechanism may use lens coupling. A fiber optic mechanism may use fiber pigtailing.

Gas reference cell 2 in FIG. 2 is configured to absorb light from the backlight beam via a plurality of narrowband absorption lines of the gas reference cell. The narrowband absorption lines are at known, well-defined wavelengths within the backlight spectrum. Gas reference cell 2 is further configured to transmit an imprinted light beam characterized by an imprinted light spectrum having a corresponding plurality of reference indicia imprinted into the spectrum. Gas reference cell 2 is configured to deliver the transmitted imprinted light beam to calibration spectrometer 3. It should be understood that the transmission and delivery of the imprinted light beam from the gas reference cell to the spectrometer may be facilitated solely by directing the backlight beam appropriately into and through the gas reference cell. Nonetheless, as will further be understood by those skilled in optics, the transmission and delivery may be facilitated by other means, such as mirrors, lenses, waveguides, or other optical components, for example.

In further reference to FIG. 2, calibration spectrometer 3 is configured to apply a plurality of reference spectral selection factors to spectrally resolve the imprinted light beam for grouping consecutive (spectrally adjacent) reference indicia within the plurality of reference indicia into a plurality of reference indicia groups, whereby each reference indicia group corresponds to a respective spectral selection factor. Calibration spectrometer 3 is further configured to detect a plurality of reference spectral power readings from the spectrally resolved imprinted light beam. Each respective reference spectral power reading corresponds to a respective reference spectral selection factor of the plurality of reference spectral selection factors. Spectrometer 3 is further configured to deliver a reference dataset for associating the reference spectral power readings with the reference spectral selection factors.

Wavelength calibrator 4 is configured to determine a calibration factor based on a difference between the reference dataset and a standard dataset, where this difference is a function of a difference between the correspondence of the plurality of reference indicia groups and a correspondence of a plurality of standard indicia groups. Wavelength calibrator 4 may also be configured to output the calibration factor for use in various ways further described herein, such as determining a control signal to control a light source to correct a centroid wavelength of its output light or to compensate for a measured centroid wavelength of the light source.

Figure 3:
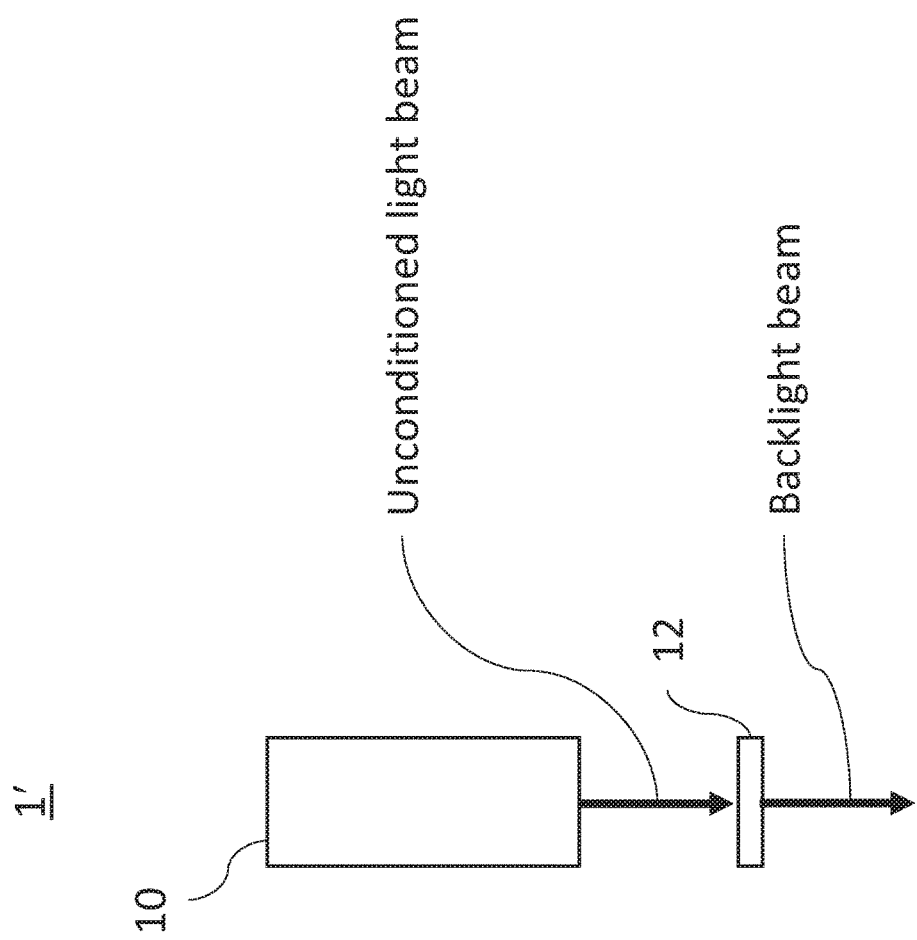
FIG. 3 is a schematic diagram of a of backlight source of the apparatus shown in FIG. 2 comprising an emitter and a flattening filter.

FIG. 3 is a schematic diagram of an embodiment of backlight source 1 of FIG. 2 shown as a backlight source 1' in FIG. 3. Backlight source 1' comprises an emitter 10 and a flattening filter 12. Emitter 10 may include at least one of a superluminescent diode (SLD), a rare-earth-doped superluminescent source (REDSLS), a light emitting diode (LED), or a supercontinuum fiber. Flattening filter 12 is configured to receive an unconditioned light beam characterized by an unconditioned spectrum from the emitter, to flatten the unconditioned spectrum, and to transmit the backlight beam. Example unconditioned and flattened spectra are illustrated in FIG. 4.

Figure 4:
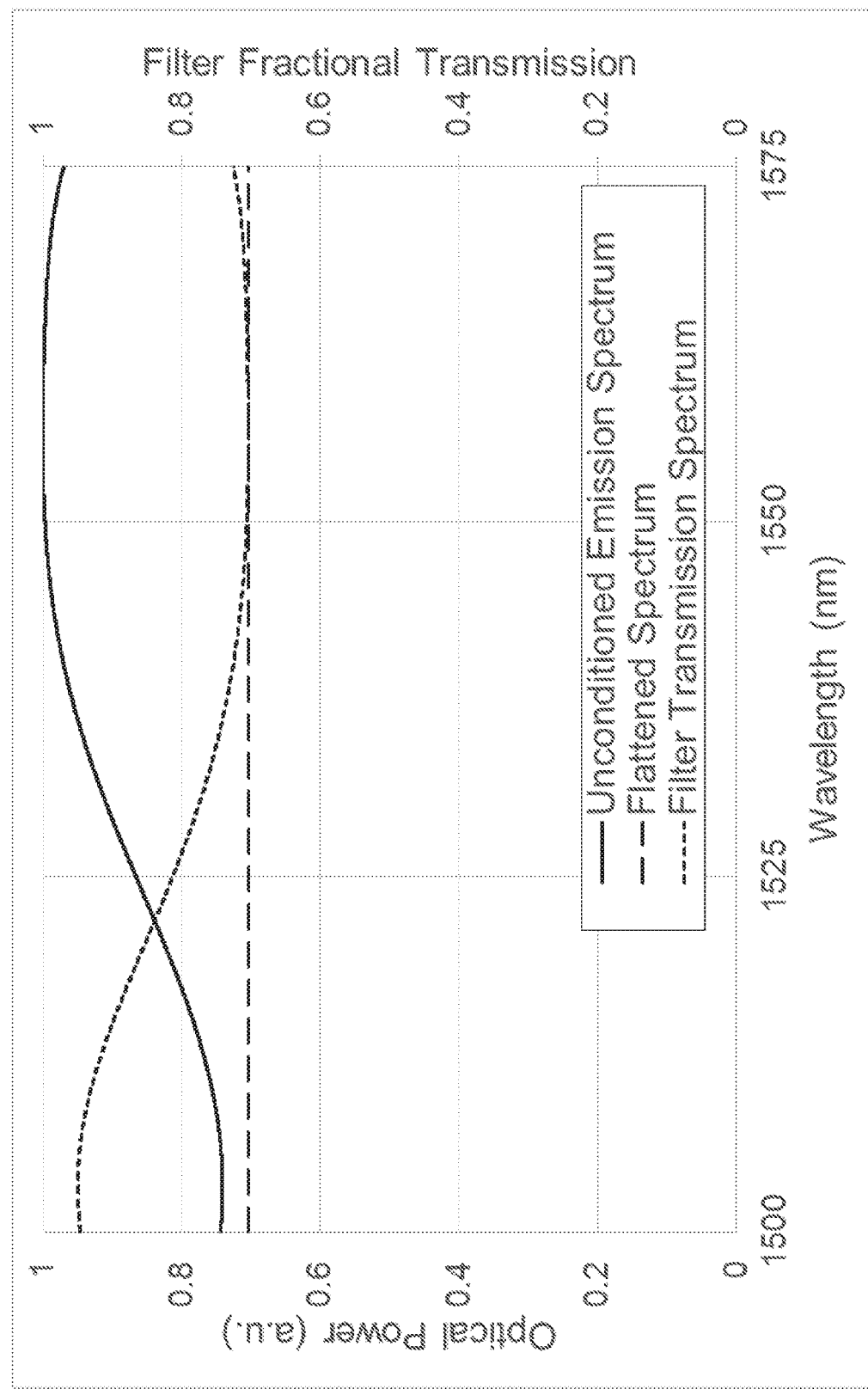
FIG. 4 shows an exemplary unconditioned spectrum of the emitter, a corresponding exemplary transmission spectrum of the flattening filter, and the corresponding flattened spectrum transmitted by the backlight source, of FIG. 3.

FIG. 4 is a graph that shows an exemplary unconditioned emission spectrum (solid line, with arbitrary optical power units shown at left vertical axis) of emitter 10, a corresponding exemplary fractional transmission spectrum (short-dash line, with filter fractional transmission units shown at right vertical axis) of flattening filter 12, and a corresponding flattened spectrum (long-dash line, with arbitrary optical power units shown at left vertical axis) transmitted by backlight source 1' of FIG. 3. The exemplary unconditioned emission spectrum shown with the solid line represents that of a commercial SLD having a "flat-top" spectral shape with about 160 nm FWHM bandwidth available from Exalos AG, Schlieren, Switzerland, and designated EXS210066-01. The fractional transmission spectrum of flattening filter 12 is designed to substantially compensate for a curvature of the unconditioned emission spectrum to result in a substantially flattened spectrum transmitted by backlight source 1'. Accordingly, in one embodiment, the flattened spectrum, shown with the long-dash line in FIG. 4, is an exemplary backlight spectrum characterizing a backlight beam delivered by the backlight source 1'. It is preferable for a backlight spectrum in various embodiments to be substantially flat, such as in the flattened spectrum shown with the long-dash line in FIG. 4. When a backlight spectrum is substantially flat, calibration error may be minimized. However, it should be understood that in other embodiments, a backlight spectrum delivered by a backlight is not substantially flat.

Figure 5A:
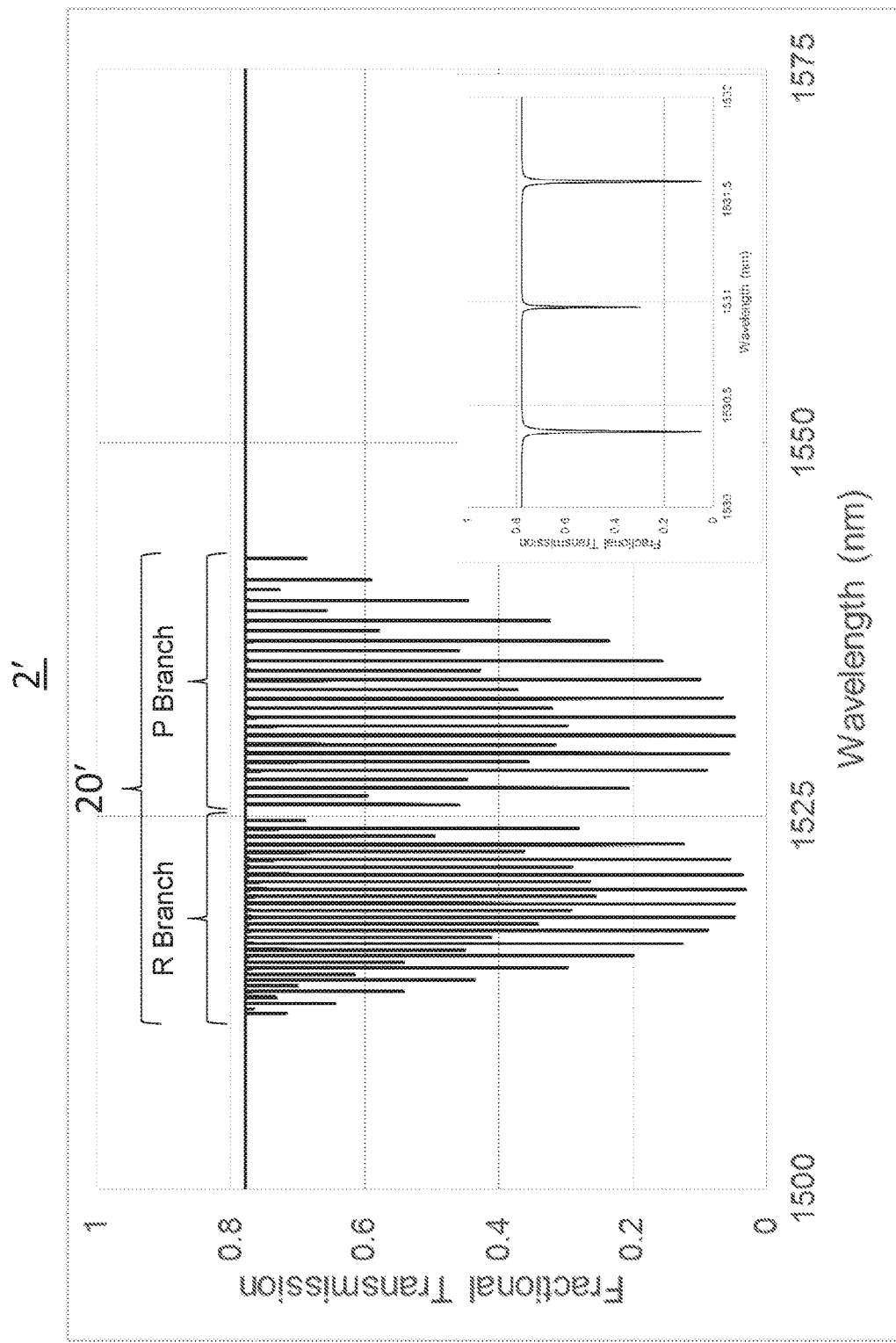
FIGS. 5A and 5B show exemplary imprinted light spectra transmitted by the gas reference cell of FIG. 2.

FIG. 5A shows an exemplary imprinted light spectrum, over wavelengths from 1500 nm to 1575 nm, of an embodiment of gas reference cell 2 shown as an acetylene ($^{12}C_2H_2$) gas reference cell 2', having a plurality of reference indicia 20' imprinted thereto. The inset shows spectral detail over wavelengths from 1530 nm to 1532 nm. The spectrum shown in FIG. 5A represents that of an acetylene gas cell having pressure of 50 Torr and path length of 5.5 cm commercially available from Wavelength References, Corvallis, Oreg., and designated C2H2-12-H(5.5)-50-FCAPC.

Figure 5B:
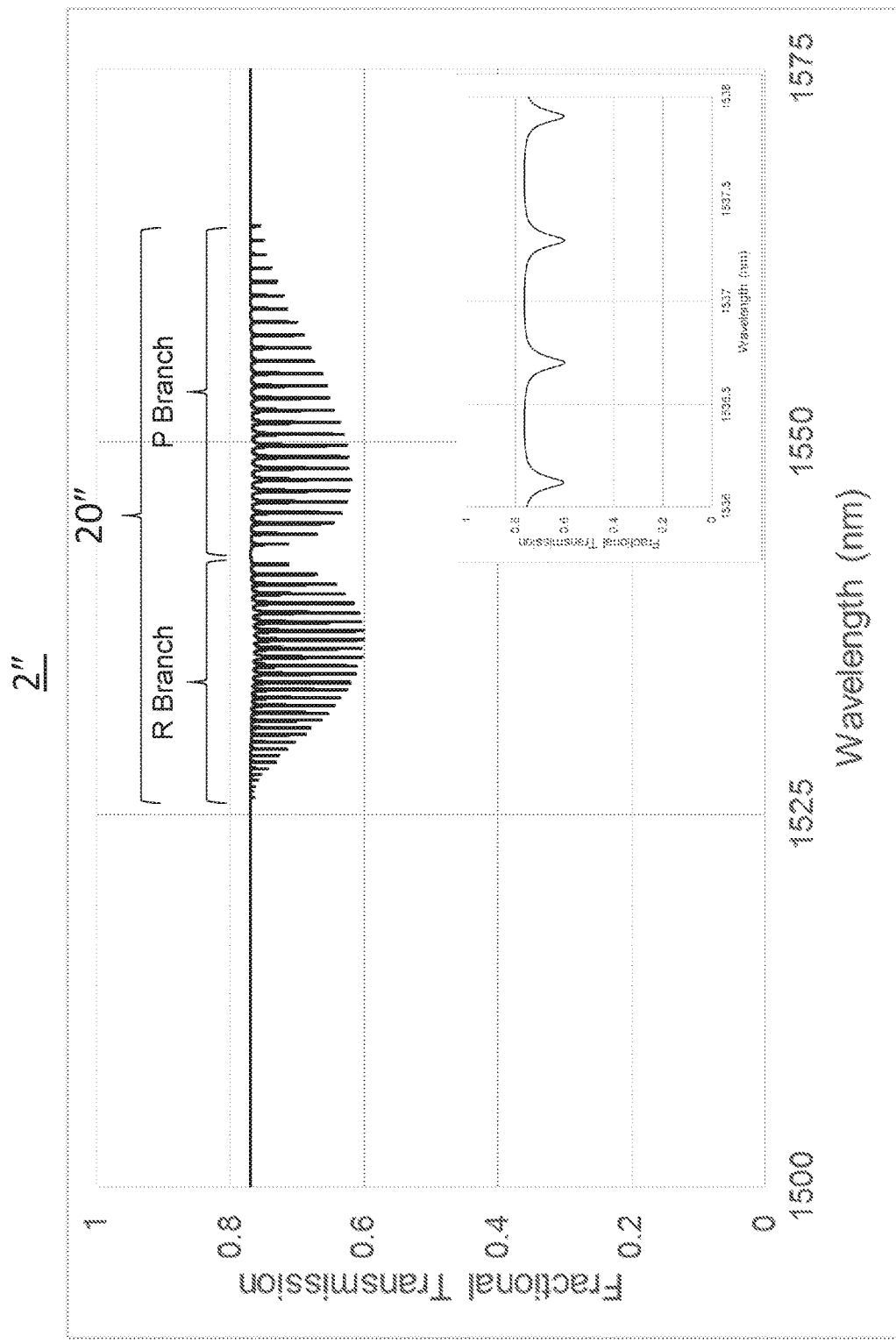

FIG. 5B shows an exemplary imprinted light spectrum, over wavelengths from 1500 nm to 1575 nm, of an embodiment of gas reference cell 2 shown as a hydrogen cyanide ($H^{13}C^{14}N$) gas reference cell 2", having a plurality of reference indicia 20" imprinted thereto. The inset shows spectral detail over wavelengths from 1536 nm to 1538 nm. The spectrum shown in FIG. 5B represents that of a hydrogen cyanide gas cell having pressure of 100 Torr and path length of 5.5 cm commercially available from Wavelength References, Corvallis, Oreg., and designated HCN-13-H(5.5)-100-FCAPC.

The pluralities of reference indicia 20' and 20" shown in FIGS. 5A and 5B, respectively, are by nature segregated into two branches, known as the R branch and the P branch as shown, which provide a resolvable spectral variability of gas reference cell 2' and 2", respectively. Although segregation into branches is not required, the nature of the gas is preferably such that a plurality of reference indicia provides a resolvable spectral variability of gas reference cell 2.

Figure 6:
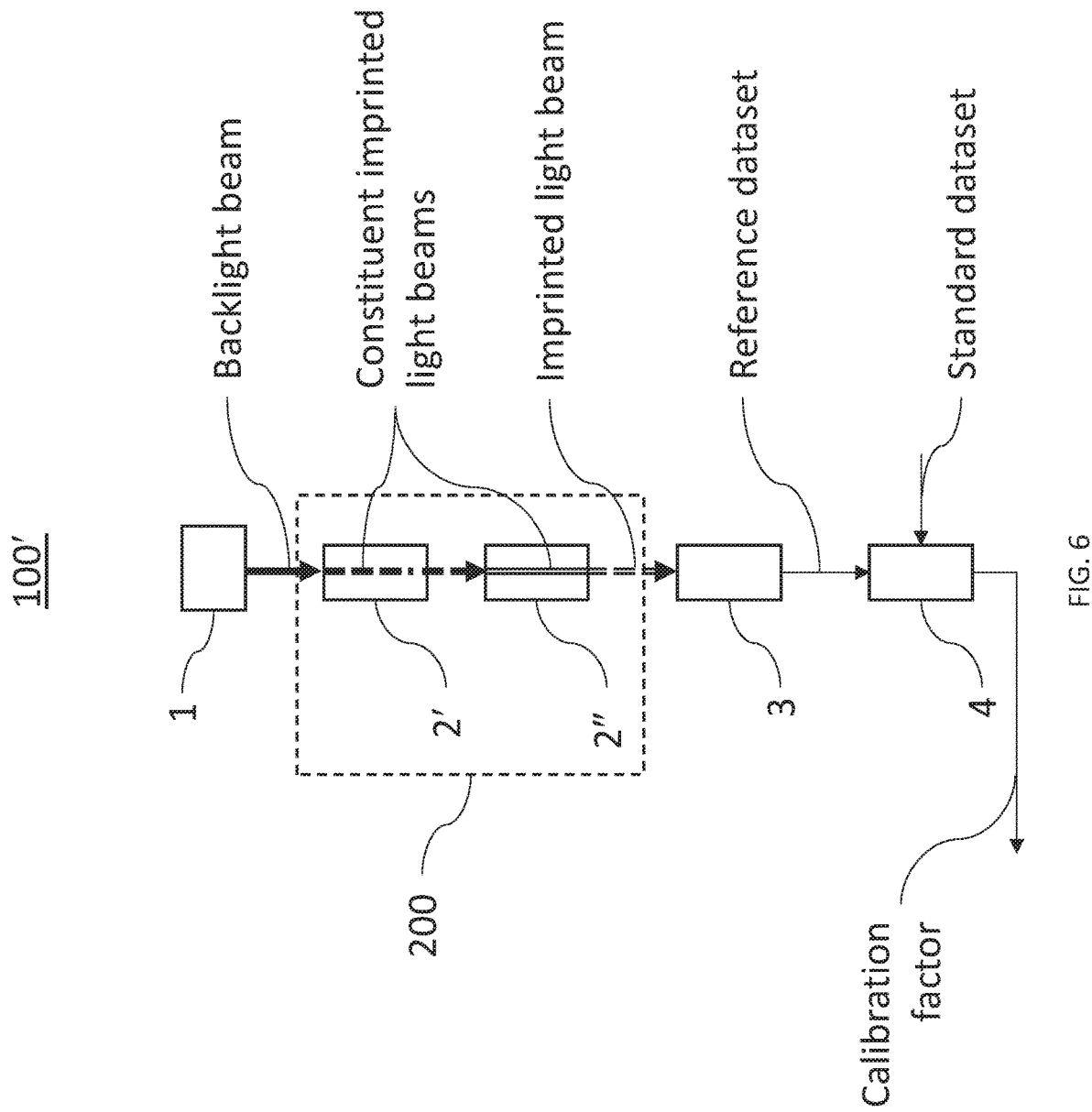
FIG. 6 is a schematic diagram of another embodiment of a grouped molecular absorption line wavelength calibration apparatus comprising a plurality of gas reference cells.

FIG. 6 is a schematic diagram of another embodiment of a grouped molecular absorption line wavelength calibration apparatus 100, shown as a grouped molecular absorption line wavelength calibration apparatus 100' comprising a plurality of gas reference cells 200 comprised of gas reference cell 2', for example filled with acetylene ($^{12}C_2H_2$) gas, and gas reference cell 2", for example filled with hydrogen cyanide ($H^{13}C^{14}N$) gas. The gas reference cells of the plurality may be optically coupled together, such as by a free space mechanism, a fiber optic mechanism, or a combination thereof, such that the imprinted light beam results from the combination of a plurality of constituent imprinted light beams corresponding to the plurality of gas reference cells.

Figure 7:
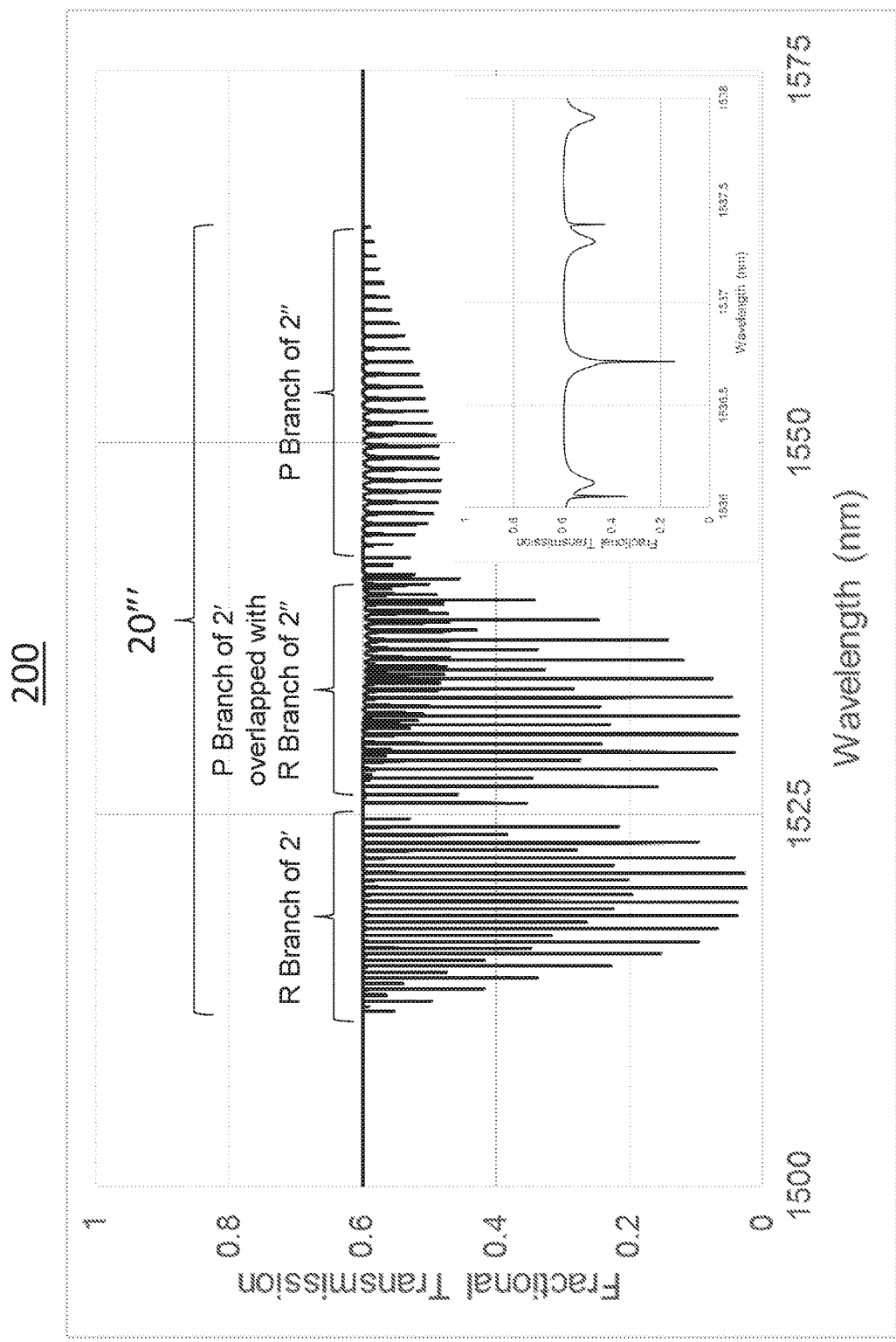
FIG. 7 shows an exemplary imprinted light spectrum transmitted by the plurality of gas reference cells of FIG. 6.

FIG. 7 shows an exemplary imprinted light spectrum, over wavelengths from 1500 nm to 1575 nm, of plurality of gas reference cells 200 shown in FIG. 6, having a plurality of reference indicia 20''' imprinted thereto. The inset shows spectral detail over wavelengths from 1536 nm to 1538 nm. Alternatively, the spectrum shown in FIG. 7 may represent that resulting from a single reference cell filled with a mixture of different gases. In FIG. 7, the P branch of gas reference cell 2' overlaps with the R branch of gas reference cell 2".

Figure 8:
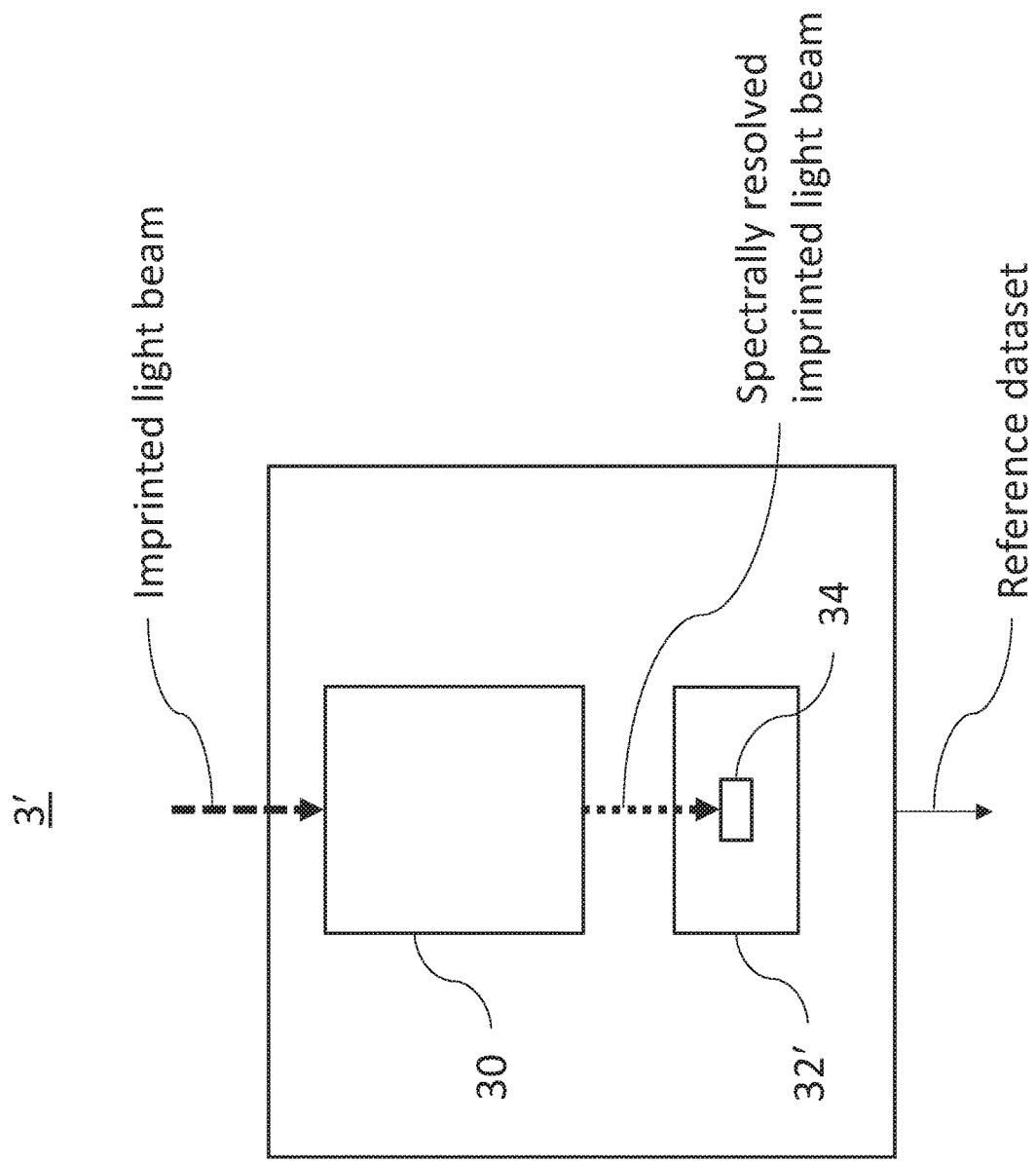
FIG. 8 is a schematic diagram of an embodiment of the spectrometer of FIG. 2 comprising an acousto-optic tunable filter (AOTF) and a spectrometric photodetector including at least one photodiode.

FIG. 8 is a schematic diagram of an embodiment of calibration spectrometer 3 of FIG. 2, shown as a calibration spectrometer 3'. Calibration spectrometer 3' comprises an acousto-optic tunable filter (AOTF) 30 having a tuning relation that relates the drive frequency of radio-frequency driving signals to peak transmission wavelengths transmitted by and output from the AOTF. Calibration spectrometer 3' further has a spectral resolution. Advantageously, the spectral resolution of calibration spectrometer 3', which is determined by the spectral resolution of AOTF 30, need not be sufficient to resolve individual narrowband lines from gas reference cells. Instead, a spectral resolution that is sufficient to resolve only groupings of consecutive (spectrally adjacent), narrowband lines represented in reference indicia of an imprinted light beam output from a gas reference cell can be sufficient for use in various embodiments. Resolution of such groupings of narrowband lines by an AOTF is illustrated and described hereinafter in connection with FIGS. 10A-10C, for example.

Calibration spectrometer 3' in FIG. 8 further comprises a spectrometric photodetector 32'. Spectrometric photodetector 32' may include a photodiode 34. AOTF 30 is configured to receive the imprinted light beam. AOTF 30 may be optically coupled to photodiode 34, such as by a free space mechanism, a fiber optic mechanism, or a combination thereof. The transmission spectrum of flattening filter 12 of FIG. 3 may further be designed to further compensate for a curvature of a responsivity spectrum of spectrometric photodetector 32'.

Figure 9A:
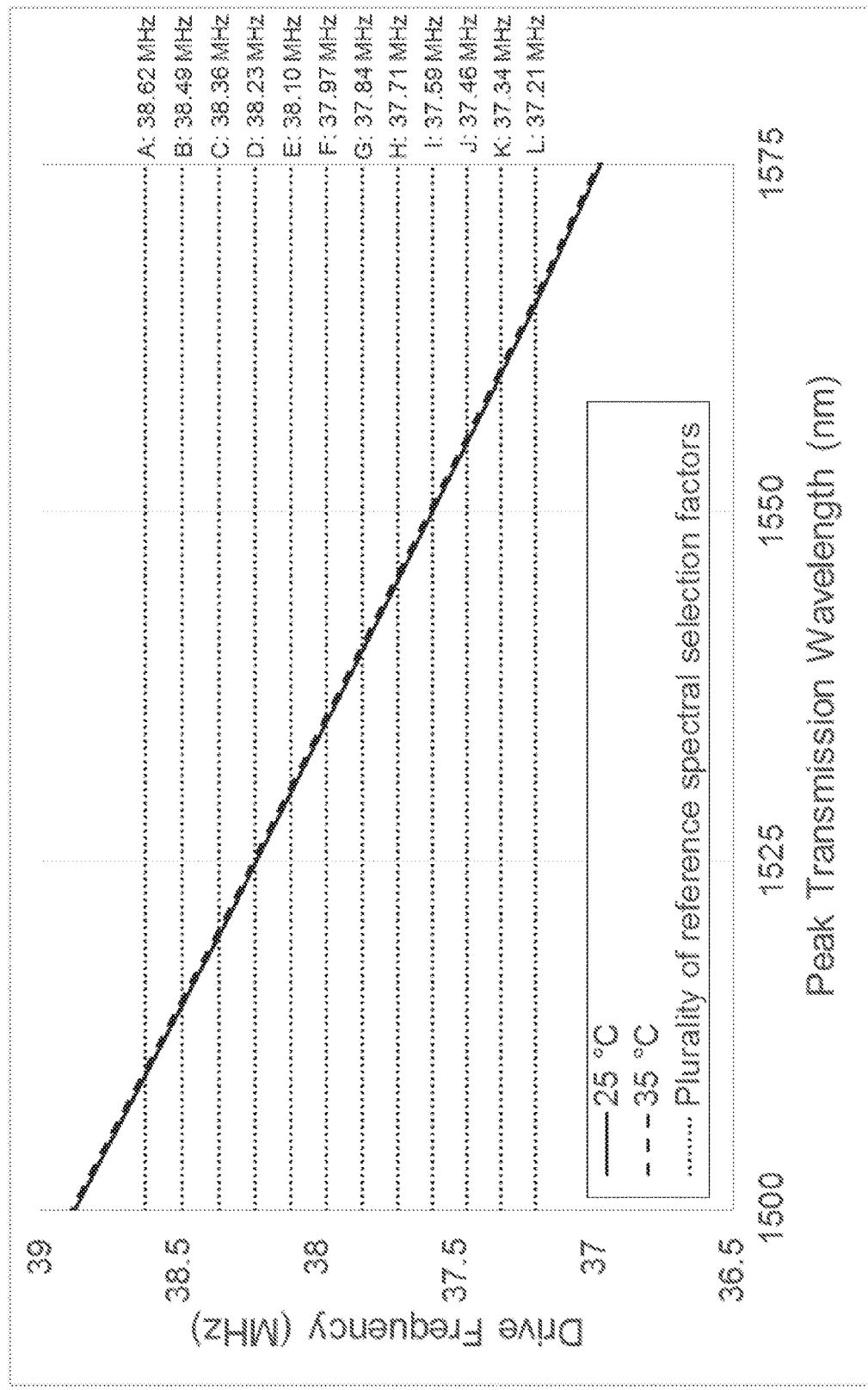
FIG. 9A is a graph that shows exemplary tuning relations of the AOTF of FIG. 8.
Figure 9B:
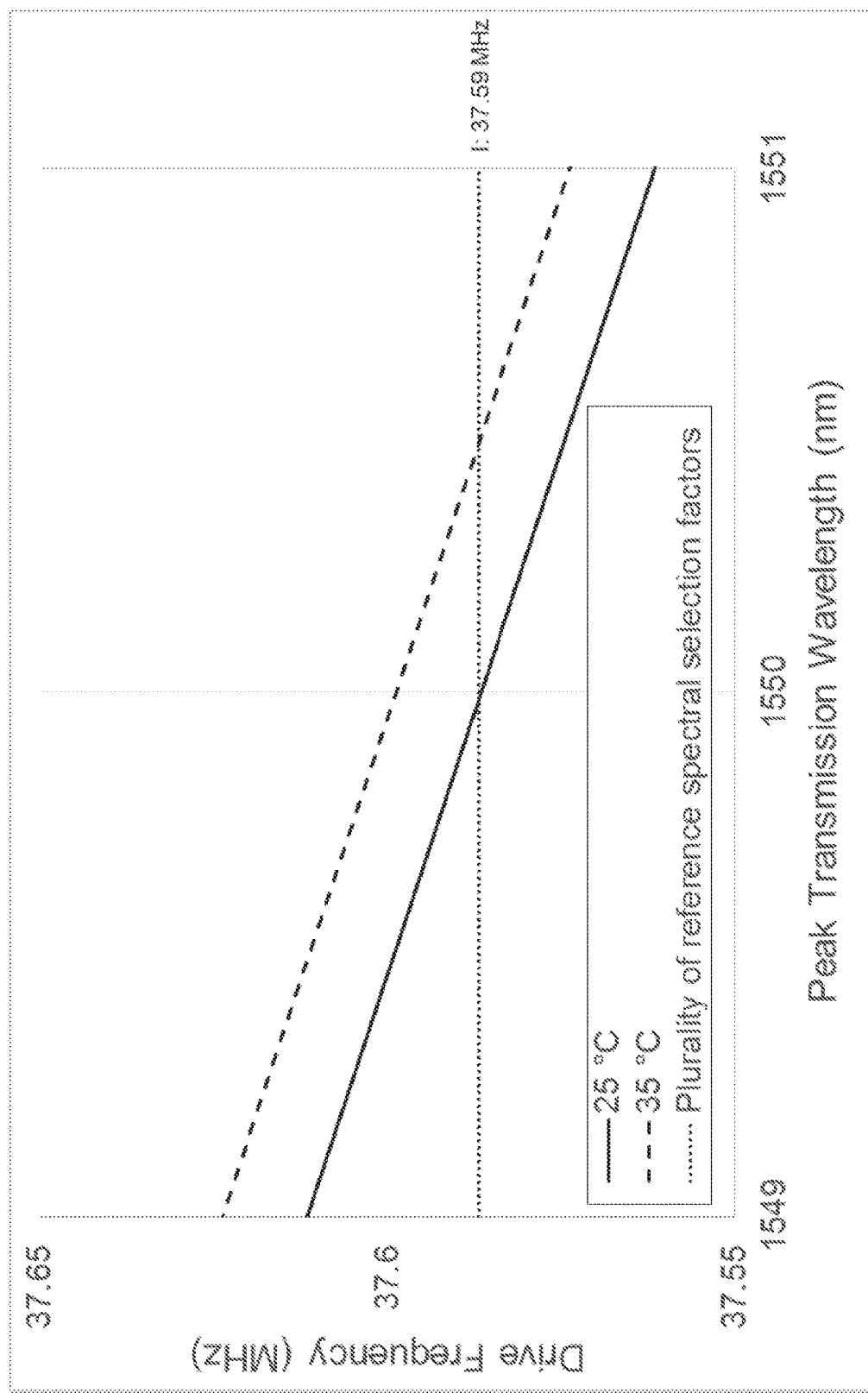
FIG. 9B is a graph that shows a detail view of the tuning relations of FIG. 9A.

FIG. 9A shows exemplary tuning relations of AOTF 30 corresponding to two different AOTF operating temperatures, namely 25° C. (solid line plot) and 35° C. (dashed line plot). The tuning relations shown in FIG. 9A represent that of a quasi-collinear tellurium dioxide AOTF commercially available from Gooch & Housego, Ilminster, United Kingdom, and designated TF1650-1100-2-3-GH40, having spectral resolution of about 1.5 nm. The difference in the tuning relations, more easily appreciated in the detail view shown in FIG. 9B, is due to a tuning relation thermal sensitivity of the AOTF of about 0.05 nm/° C. AOTF 30 may further have a tuning relation ionizing radiation sensitivity. The horizontal dotted lines indicate a plurality of reference spectral selection factors, corresponding to a plurality of AOTF drive frequencies as indicated with plot labels A through L, applied in the following FIGS. 10A and 10B. Because of tuning relation operational sensitivity, such as thermal sensitivity or ionizing radiation sensitivity, the relation between drive frequency and peak transmission wavelength would depend on the operating conditions. This dependence is indicated by the different intersection points between the horizontal dotted lines and the tuning relation plots in FIG. 9A, and more easily appreciated in FIG. 9B.

Figure 10A:
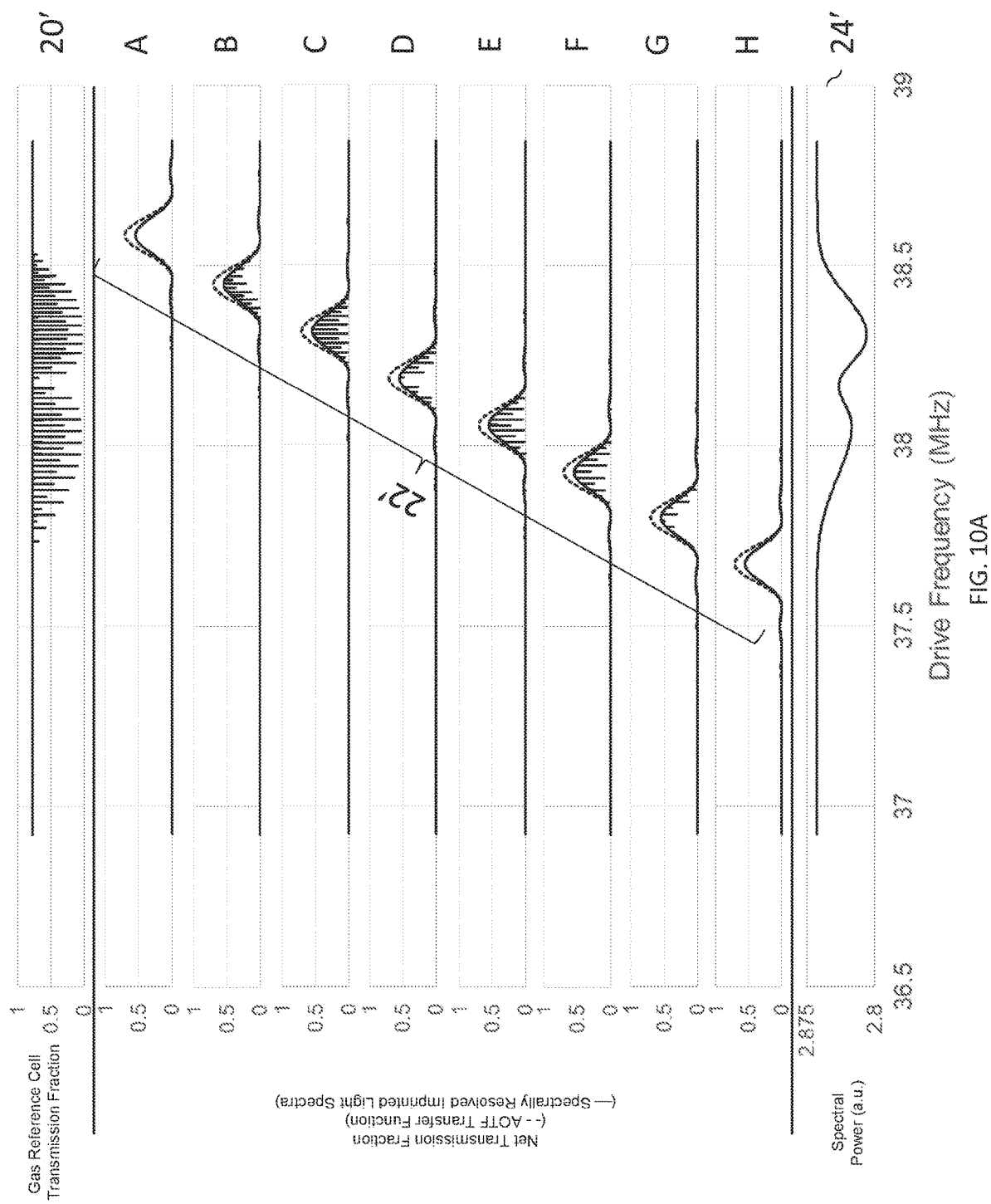
FIGS. 10A, 10B, and 10C show the imprinted light spectra recast in terms of a plurality of spectral selection factors comprised of a plurality of AOTF drive frequencies; examples of AOTF transfer functions and the corresponding spectrally resolved imprinted light spectra; and pluralities of reference spectral power readings from spectrally resolved imprinted light beams corresponding to the pluralities of reference spectral selection factors.

FIG. 10A shows at top the imprinted light spectrum (solid line plot) from the acetylene gas reference cell 2' of FIG. 5A, having plurality of reference indicia 20' imprinted thereto, recast in terms of a plurality of spectral selection factors comprised of a plurality of AOTF drive frequencies according to the 25° C. tuning relation shown in FIG. 9A. The AOTF drive frequencies of the plurality may be applied to the AOTF via a swept drive sequence across a frequency range. Alternatively, the radio-frequency driving signals of the plurality may be applied to the AOTF via an arbitrary or random sequence.

FIG. 10A also shows eight examples, labeled A through H, corresponding to the respective drive frequencies highlighted in FIG. 9A, of AOTF transfer functions having $sinc^2$ dependence (dashed line plots), and the corresponding, spectrally resolved, imprinted light spectra (solid line plots) of the spectrally resolved, imprinted light beam showing the grouping of consecutive (spectrally adjacent) reference indicia within plurality of reference indicia 20' into plurality of reference indicia groups 22', whereby each reference indicia group corresponds to a respective spectral selection factor. The combination of the spectral resolution of the AOTF and the plurality of AOTF drive frequencies determines the plurality of reference indicia groups.

FIG. 10A also shows, at bottom, a plurality of reference spectral power readings (solid line plot) from the spectrally resolved, imprinted light beam corresponding to the plurality of reference spectral selection factors, which represents a reference dataset 24' that associates reference spectral power readings with the reference spectral selection factors.

Figure 10B:
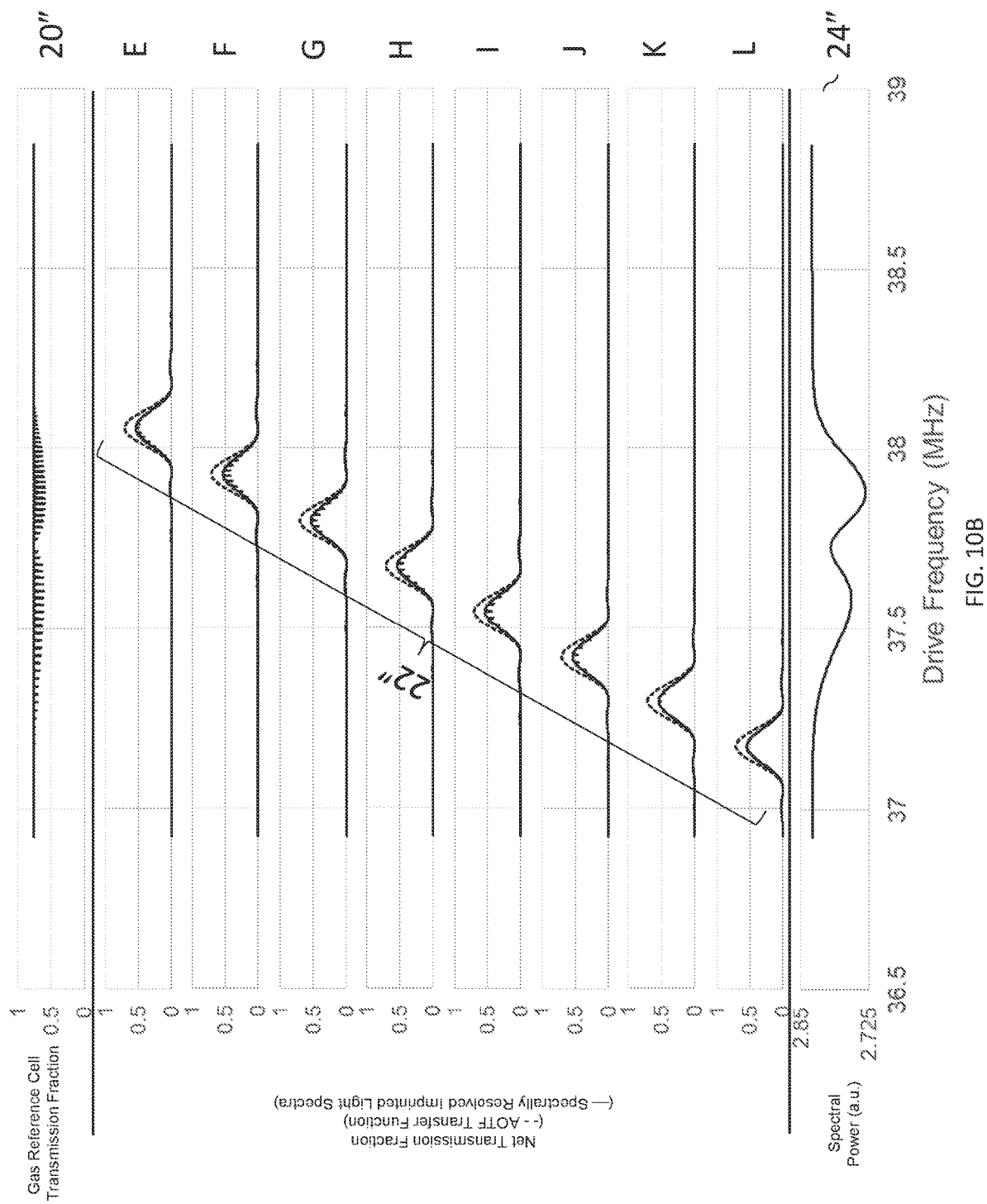

FIG. 10B shows the imprinted light spectrum (solid line plot) from the hydrogen cyanide gas reference cell 2" of FIG. 5B, having plurality of reference indicia 20" imprinted thereto, recast in terms of a plurality of spectral selection factors comprised of a plurality of AOTF drive frequencies according to the 25° C. tuning relation shown in FIG. 9A. FIG. 10B also shows eight examples, labeled E through L, corresponding to the AOTF drive frequencies highlighted in FIG. 9A, of AOTF transfer functions having $sinc^2$ dependence (dashed line plots), and the corresponding spectrally resolved imprinted light spectra (solid line plots) of the spectrally resolved imprinted light beam showing the grouping of consecutive, adjacent reference indicia within plurality of reference indicia 20" into plurality of reference indicia groups 22", whereby each reference indicia group corresponds to a respective spectral selection factor. FIG. 10B also shows, at bottom, a plurality of reference spectral power readings (solid line plot) from the spectrally resolved imprinted light beam corresponding to the plurality of reference spectral selection factors, which represents a reference dataset 24" that associates reference spectral power readings with the reference spectral selection factors.

Figure 10C:
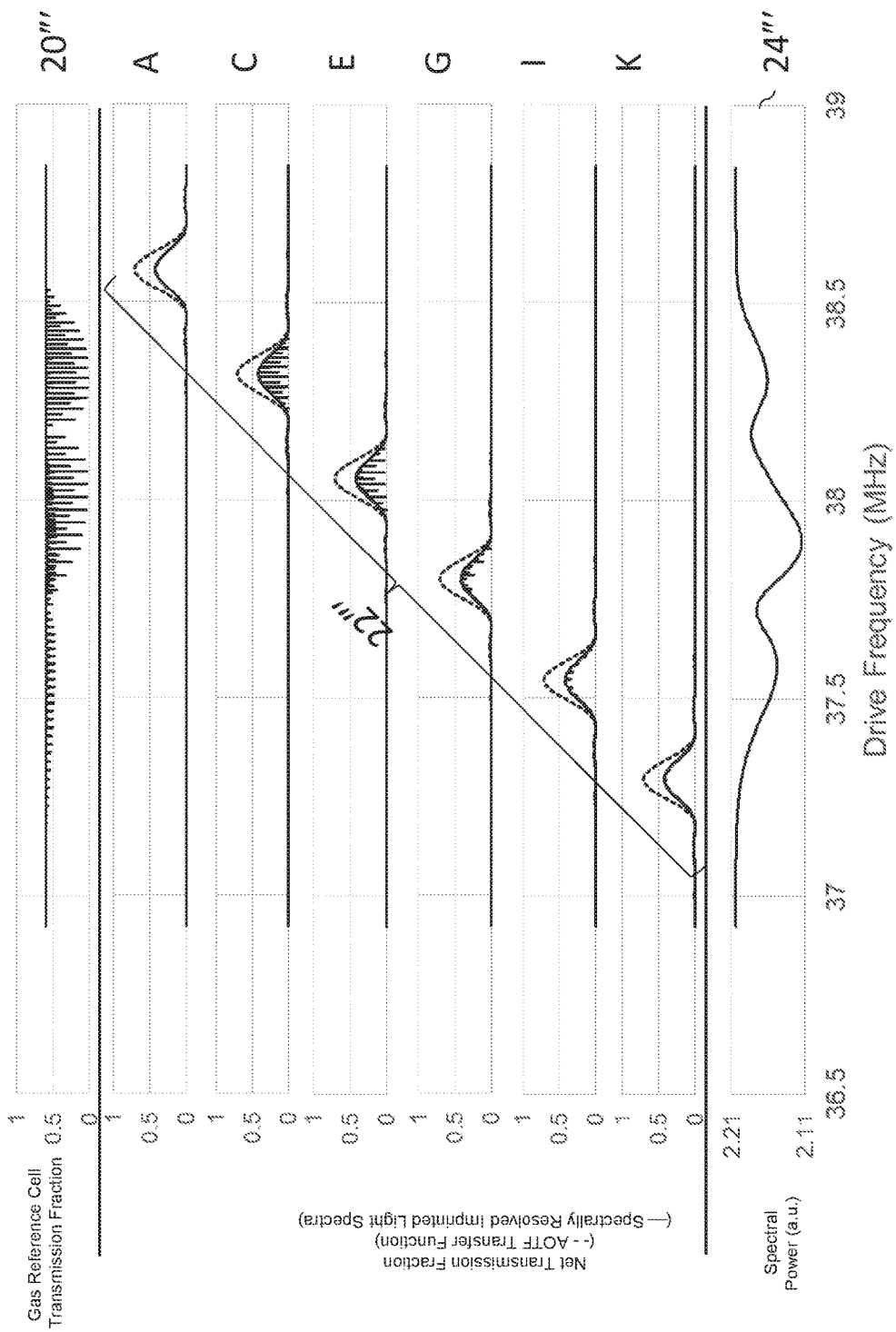

FIG. 10C shows the imprinted light spectrum (solid line plot) from the plurality of gas reference cells 200 of FIG. 7, having plurality of reference indicia 20''' imprinted thereto, recast in terms of a plurality of spectral selection factors comprised of a plurality of AOTF drive frequencies according to the 25° C. tuning relation shown in FIG. 9A. FIG. 10C also shows six examples, labeled A, C, E, G, I, and K corresponding to the AOTF drive frequencies highlighted in FIG. 9A, of AOTF transfer functions having $sinc^2$ dependence (dashed line plots), and the corresponding spectrally resolved imprinted light spectra (solid line plots) of the spectrally resolved imprinted light beam showing the grouping of consecutive reference indicia within plurality of reference indicia 20''' into plurality of reference indicia groups 22''', whereby each reference indicia group corresponds to a respective spectral selection factor. FIG. 10C also shows, at bottom, a plurality of reference spectral power readings (solid line plot) from the spectrally resolved imprinted light beam corresponding to the plurality of reference spectral selection factors, which represents reference dataset 24''' that associates reference spectral power readings with the reference spectral selection factors.

Figure 11A:
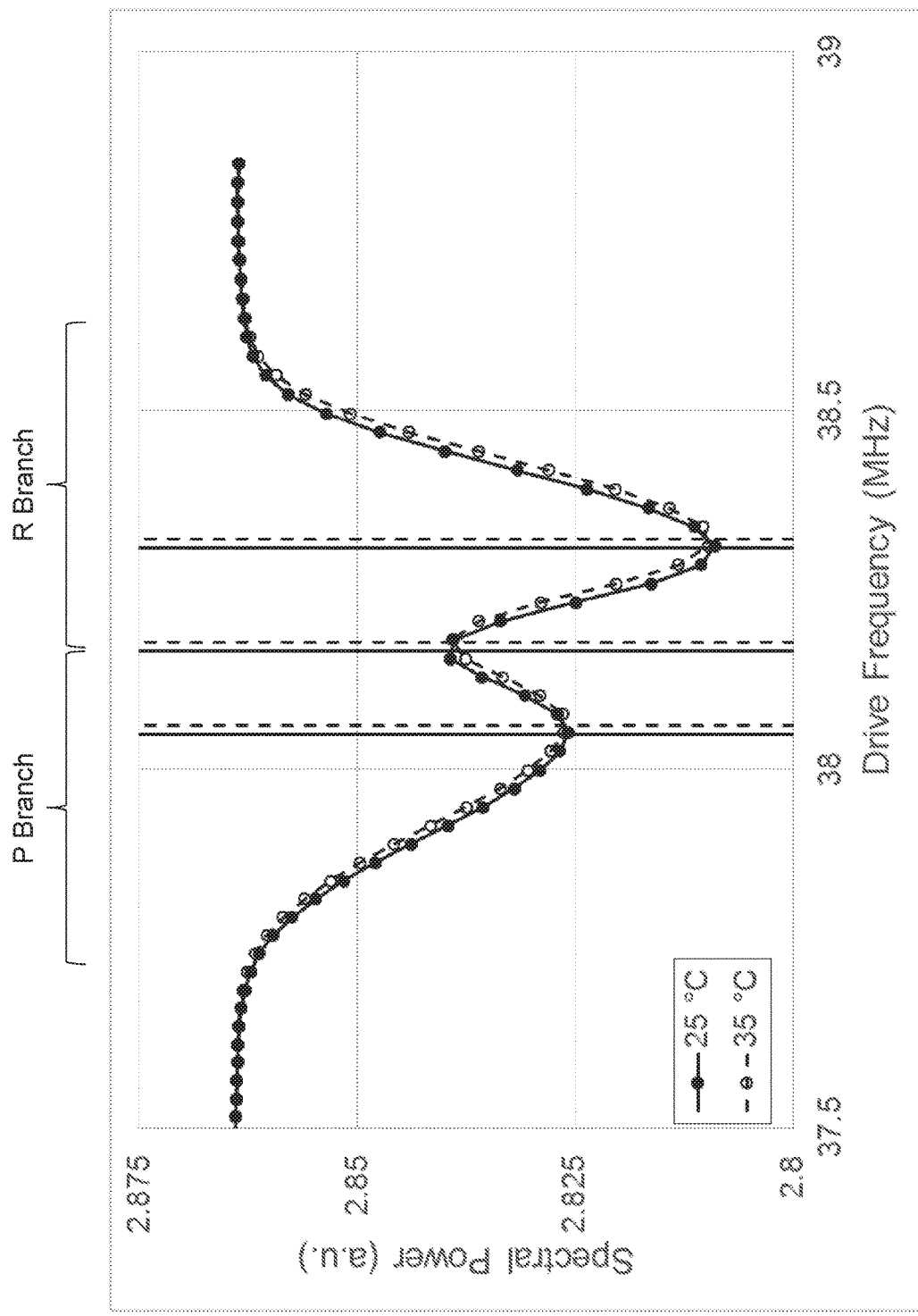
FIGS. 11A, 11B, and 11C show plots of the pluralities of reference spectral power readings of FIGS. 10A, 10B, and 10C, respectively, for two different AOTF operating temperatures.

FIG. 11A shows the bottom plot of the plurality of reference spectral power readings for AOTF operating temperature of 25° C. (represented by filled circles connected by solid lines) from FIG. 10A along with a plot of the plurality of reference spectral power readings for AOTF operating temperature of 35° C. (represented by open circles connected by dashed lines). In FIG. 11A and the following, the drive frequencies are shown, by way of example, to be separated by about 0.025 MHz, corresponding to about 1 nm optical wavelength. The solid and dashed vertical lines indicate the locations of spectral landmarks (peaks and valleys where the first derivative is zero) for the 25° C. and 35° C. pluralities of reference spectral power readings, respectively, as determined, for example, by a known algorithm that fits a quadratic polynomial to sequential groups of data points. In FIG. 11A, three spectral landmarks are present for each plurality of reference spectral power readings, namely two transmission valleys corresponding to the R and P branches of gas reference cell 2', and the one peak therebetween.

Figure 11B:
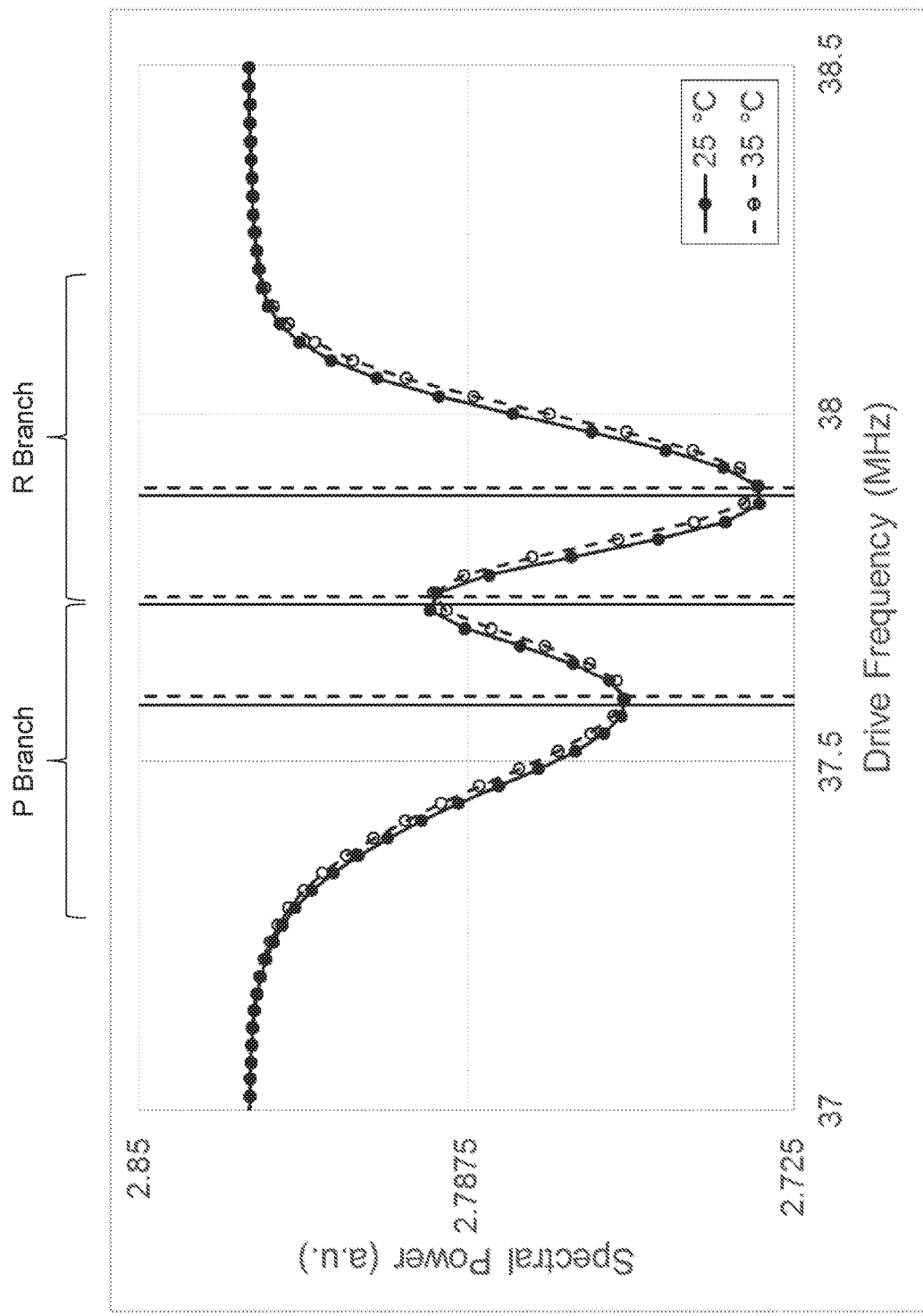

FIG. 11B shows the bottom plot of the plurality of reference spectral power readings for AOTF operating temperature of 25° C. (represented by filled circles connected by solid lines) from FIG. 10B along with a plot of the plurality of reference spectral power readings for AOTF operating temperature of 35° C. (represented by open circles connected by dashed lines). The solid and dashed vertical lines indicate the locations of spectral landmarks for the 25° C. and 35° C. pluralities of reference spectral power readings, respectively. In FIG. 11B, three spectral landmarks are present for each plurality of reference spectral power readings, namely two transmission valleys corresponding to the R and P branches of gas reference cell 2'', and the one peak therebetween.

Figure 11C:
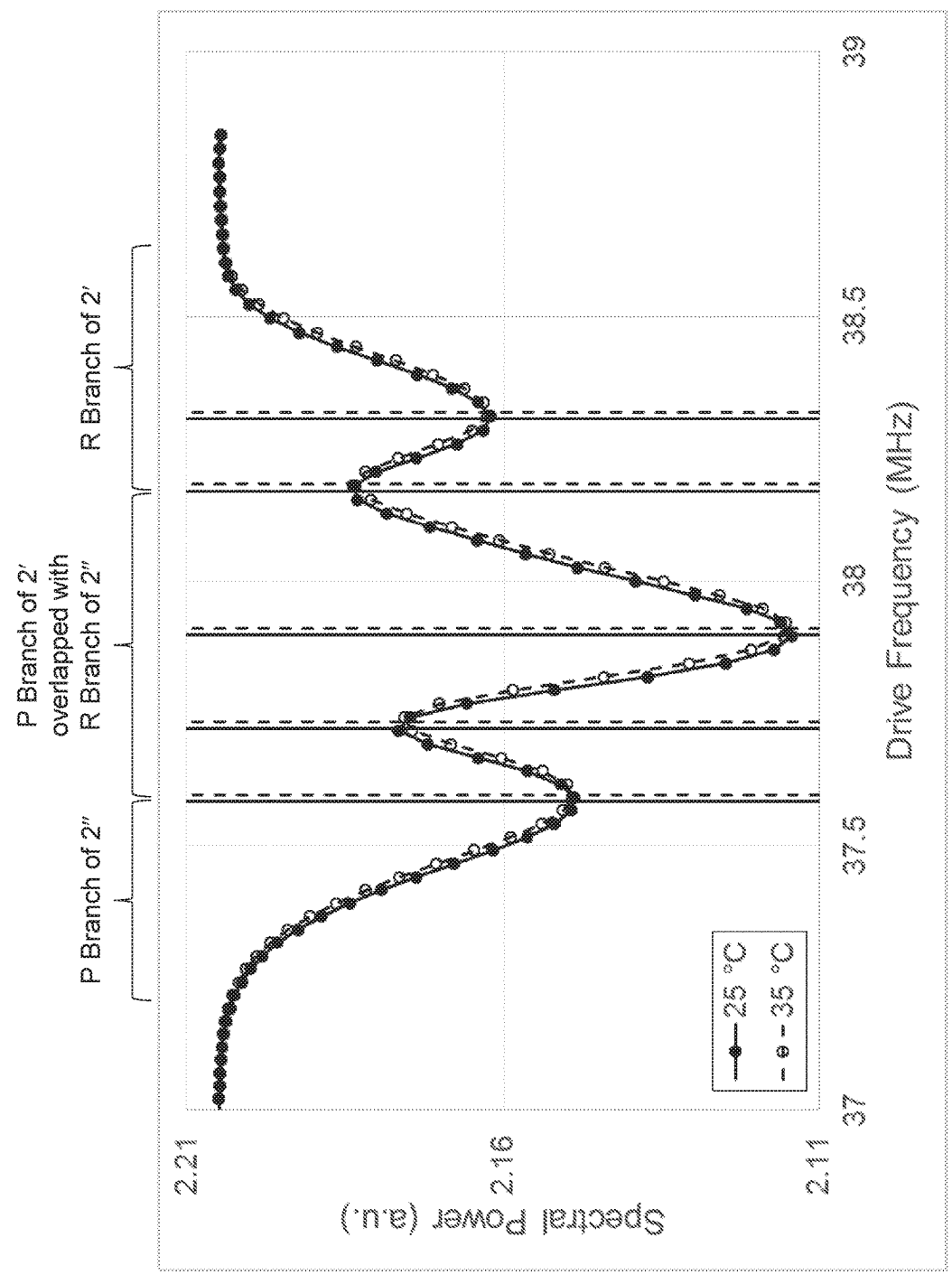

FIG. 11C shows the bottom plot of the plurality of reference spectral power readings for AOTF operating temperature of 25° C. (represented by filled circles connected by solid lines) from FIG. 10C along with a plot of the plurality of reference spectral power readings for AOTF operating temperature of 35° C. (represented by open circles connected by dashed lines). The solid and dashed vertical lines indicate the locations of spectral landmarks for the 25° C. and 35° C. pluralities of reference spectral power readings, respectively. In FIG. 11C, five spectral landmarks are present for each plurality of reference spectral power readings, namely three transmission valleys corresponding to the various overlapping and non-overlapping branches of plurality of gas reference cells 200, and the two peaks therebetween, each peak between an adjacent pair of the transmission valleys.

Figure 12A:
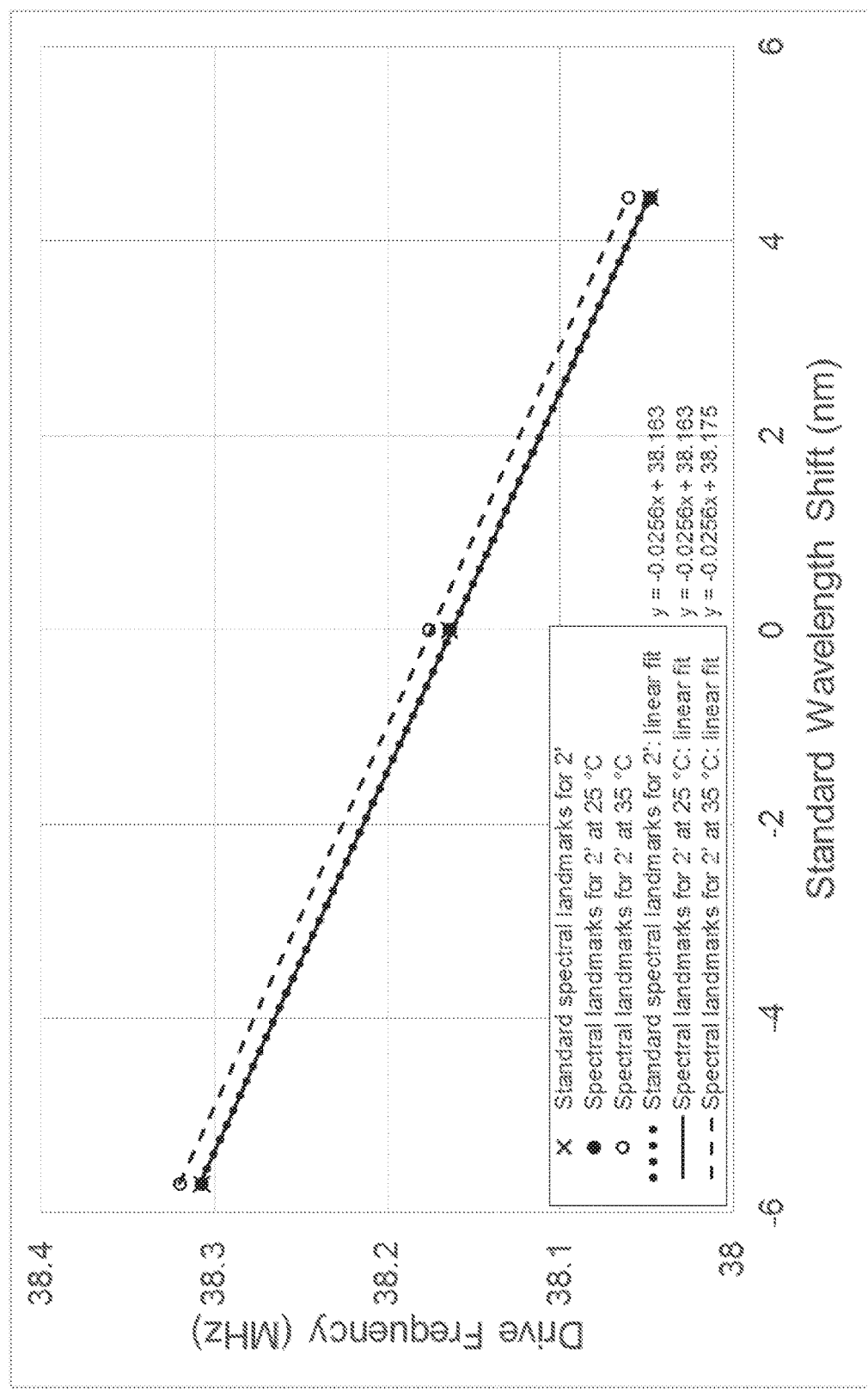
FIGS. 12A, 12B, and 12C show plots of the spectral landmark locations from FIGS. 11A, 11B, and 11C, respectively, for the two different AOTF operating temperatures.

FIG. 12A shows the spectral landmark locations, in terms of AOTF drive frequency, for the 25° C. and 35° C. pluralities of reference spectral power readings of FIG. 11A for gas reference cell 2', plotted as respective functions of the standard spectral landmark locations, in terms of wavelength shift relative to a central landmark, for gas reference cell 2'. In FIG. 12A, the standard spectral landmark locations are defined as those corresponding to AOTF operating temperature of 25° C.

FIG. 12A also shows the standard spectral landmark locations, in terms of AOTF drive frequency, for gas reference cell 2', plotted against the standard spectral landmark locations, in terms of wavelength shift, for gas reference cell 2'. Also shown are linear fits to the data and corresponding fit equations in the form y=a*x+b, where y represents AOTF drive frequency, x represents standard wavelength shift, and a and b represent the slope and intercept, respectively, of the fit line.

FIG. 12A shows that the spectral landmark locations and fit line for the 25° C. plurality of reference spectral power readings match the standard spectral landmark locations and fit line, thus validating that the AOTF operating temperature is indeed 25° C. as defined by the standard. FIG. 12A also shows that the spectral landmark locations and fit line for the 35° C. plurality of reference spectral power readings are offset from the standard spectral landmark locations and fit line, thus indicating that the AOTF operating temperature is offset from the 25° C. standard corresponding to the difference between the intercepts. Wavelength calibrator 4 of FIG. 2, configured to determine the difference between the intercept of the spectral landmark location fit line with respect to the standard spectral landmark location fit line, can, therefore, determine the operating temperature of, and corresponding additive calibration factor for, calibration spectrometer 3.

For gas reference cell 2', the thermal sensitivity of the fit line intercept is (38.175 MHz−38.163 MHz)/(35° C.−25° C.)=0.0012 MHz/° C., and since the slope of the fit line is −0.0256 MHz/nm, the additive calibration factor can be determined by dividing the difference between the intercepts by the slope, in this example (38.175 MHz−38.163 MHz)/(−0.0256 MHz/nm)=−0.469 nm for the 35° C. plurality of reference spectral power readings.

Figure 12B:
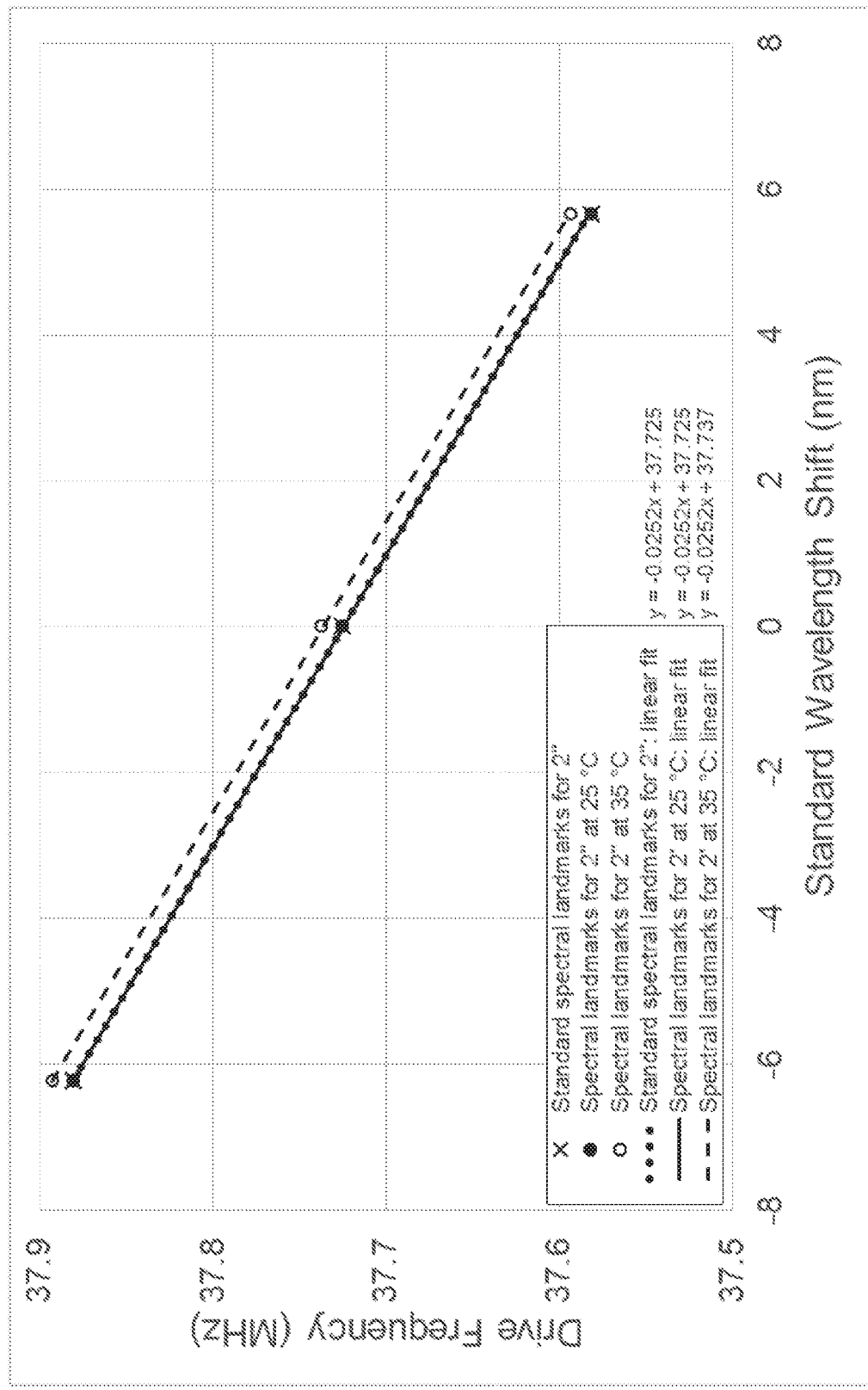

FIG. 12B shows the spectral landmark locations, in terms of AOTF drive frequency, for the 25° C. and 35° C. pluralities of reference spectral power readings of FIG. 11B for gas reference cell 2'', plotted as respective functions of the standard spectral landmark locations, in terms of wavelength shift relative to a central landmark, for gas reference cell 2''. In FIG. 12B the standard spectral landmark locations are defined as those corresponding to AOTF operating temperature of 25° C.

FIG. 12B also shows the standard spectral landmark locations, in terms of AOTF drive frequency, for gas reference cell 2'', plotted against the standard spectral landmark locations, in terms of wavelength shift, for gas reference cell 2''. Also shown are linear fits to the data and corresponding fit equations in the form y=a*x+b, where y represents AOTF drive frequency, x represents standard wavelength shift, and a and b represent the slope and intercept, respectively, of the fit line.

FIG. 12B shows that the spectral landmark locations and fit line for the 25° C. plurality of reference spectral power readings match the standard spectral landmark locations and fit line, thus validating that the AOTF operating temperature is indeed 25° C. as defined by the standard. FIG. 12B also shows that the spectral landmark locations and fit line for the 35° C. plurality of reference spectral power readings are offset from the standard spectral landmark locations and fit line, thus indicating that the AOTF operating temperature is offset from the 25° C. standard corresponding to the difference between the intercepts. For gas reference cell 2", the thermal sensitivity of the fit line intercept is (37.737 MHz−37.725 MHz)/(35° C.−25° C.)=0.0012 MHz/° C., and since the slope of the fit line is −0.0252 MHz/nm the additive calibration factor can be determined by dividing the difference between the intercepts by the slope, in this example (37.737 MHz−37.725 MHz)/(−0.0252 MHz/nm)=−0.476 nm for the 35° C. plurality of reference spectral power readings.

Figure 12C:
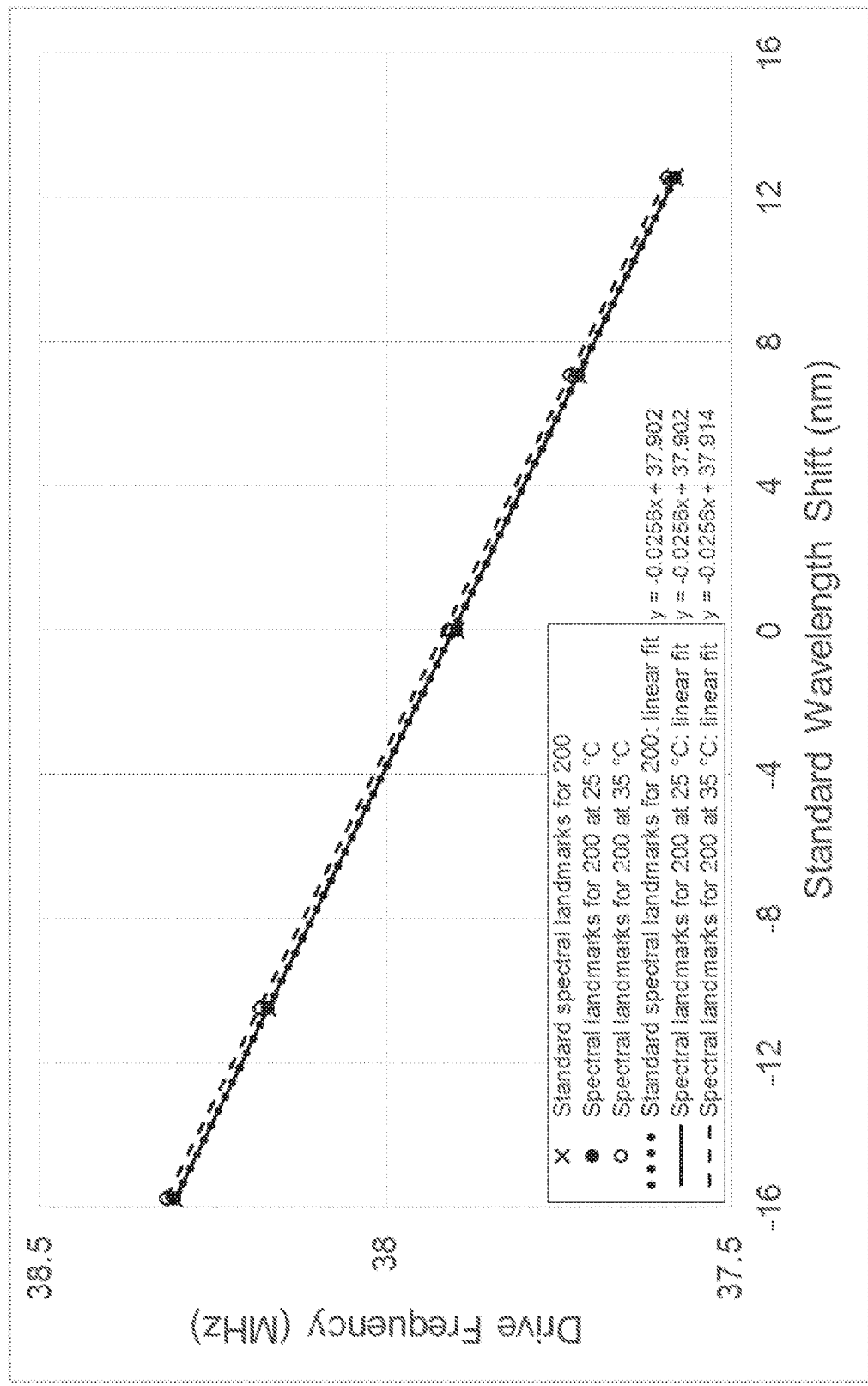

FIG. 12C shows the spectral landmark locations, in terms of AOTF drive frequency, for the 25° C. and 35° C. pluralities of reference spectral power readings of FIG. 11C for plurality of gas reference cells 200, plotted against the standard spectral landmark locations, in terms of wavelength shift relative to a central landmark, for plurality of gas reference cells 200. In FIG. 12C the standard spectral landmark locations are defined as those corresponding to AOTF operating temperature of 25° C.

FIG. 12C also shows the standard spectral landmark locations, in terms of AOTF drive frequency, for plurality of gas reference cells 200, plotted as functions of the standard spectral landmark locations, in terms of wavelength shift, for plurality of gas reference cells 200. Also shown are linear fits to the data and corresponding fit equations in the form y=a*x+b, where y represents AOTF drive frequency, x represents standard wavelength shift, and a and b represent the slope and intercept, respectively, of the fit line.

FIG. 12C shows that the spectral landmark locations and fit line for the 25° C. plurality of reference spectral power readings match the standard spectral landmark locations and fit line, thus validating that the AOTF operating temperature is indeed 25° C. as defined by the standard. FIG. 12C also shows that the spectral landmark locations and fit line for the 35° C. plurality of reference spectral power readings are offset from the standard spectral landmark locations and fit line, thus indicating that the AOTF operating temperature is offset from the 25° C. standard corresponding to the difference between the intercepts.

For plurality of gas reference cells 200, the thermal sensitivity of the fit line intercept is (37.914 MHz−37.902 MHz)/(35° C.−25° C.)=0.0012 MHz/° C., and since the slope of the fit line is −0.0256 MHz/nm, the additive calibration factor can be determined by dividing the difference between the intercepts by the slope, in this example (37.914 MHz−37.902 MHz)/(−0.0256 MHz/nm)=−0.469 nm for the 35° C. plurality of reference spectral power readings. An advantage of using a plurality of gas reference cells, as opposed to a single gas reference cell, is that the plurality of gas reference cells can provide a greater number of spectral landmarks and, thus, provide improved accuracy of the fit line when noise affects the spectral power readings.

Figure 13:
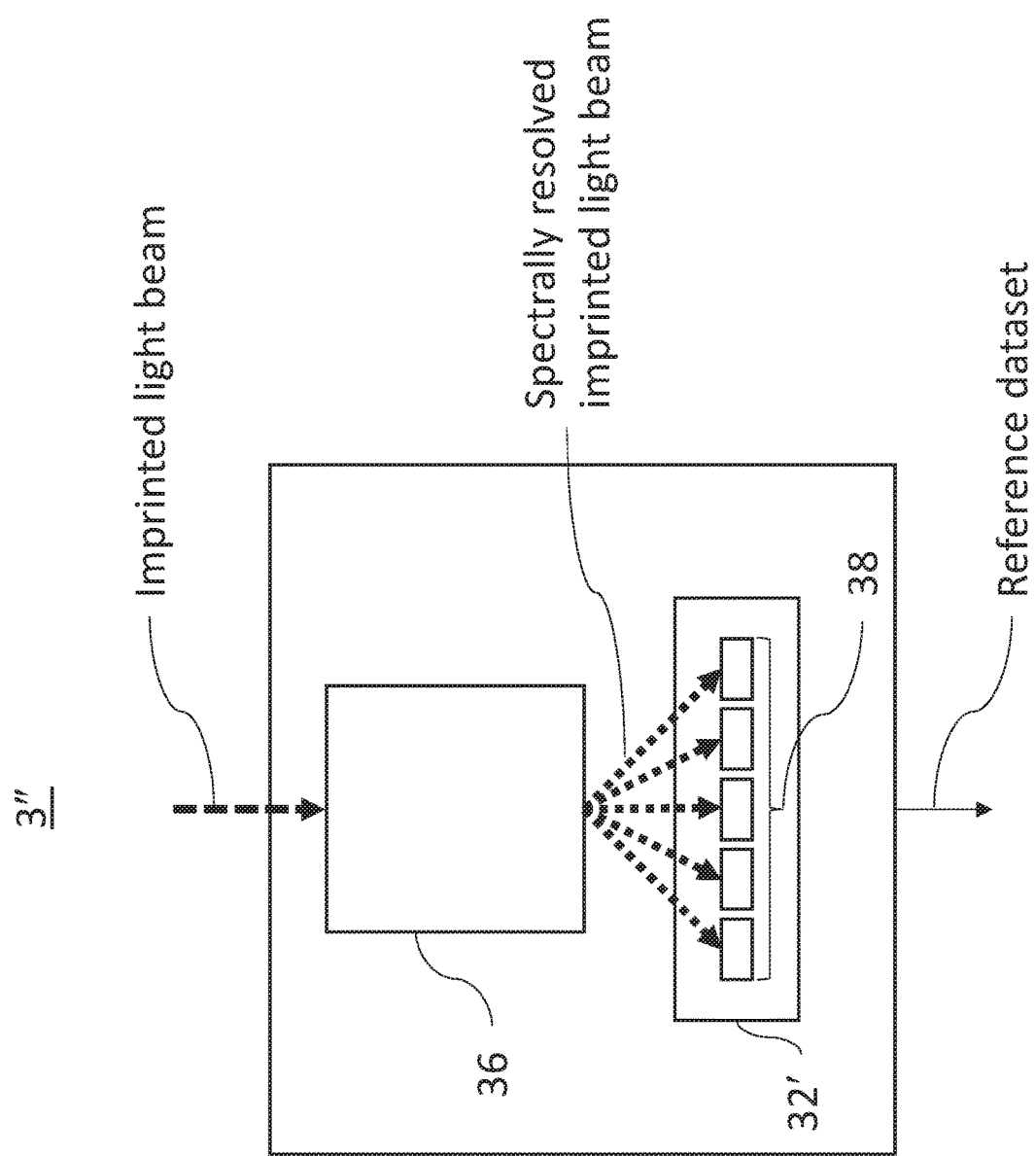
FIG. 13 is a schematic diagram of another embodiment of the spectrometer of FIG. 2 comprising a dispersive element and a spectrometric photodetector including a plurality of photodiodes.

FIG. 13 is a schematic diagram of another embodiment of spectrometer 3 of FIG. 2, shown as a calibration spectrometer 3". Calibration spectrometer 3" comprises dispersive element 36 and spectrometric photodetector 32" including plurality of photodiodes comprising photodiode array 38. Dispersive element 36 may include those known in the art such as a diffraction grating or prism. Dispersive element 36 spectrally distributes the imprinted light beam whereby the plurality of spectral selection factors includes a plurality of dispersion angles and the combination of a pitch of photodiode array 38 and an angular dispersion of the dispersive element determines a plurality of reference indicia groups.

The transmission spectrum of flattening filter 12 of FIG. 3 may further be designed to further compensate for a curvature of a responsivity spectrum of spectrometric photodetector 32".

Figure 14A:
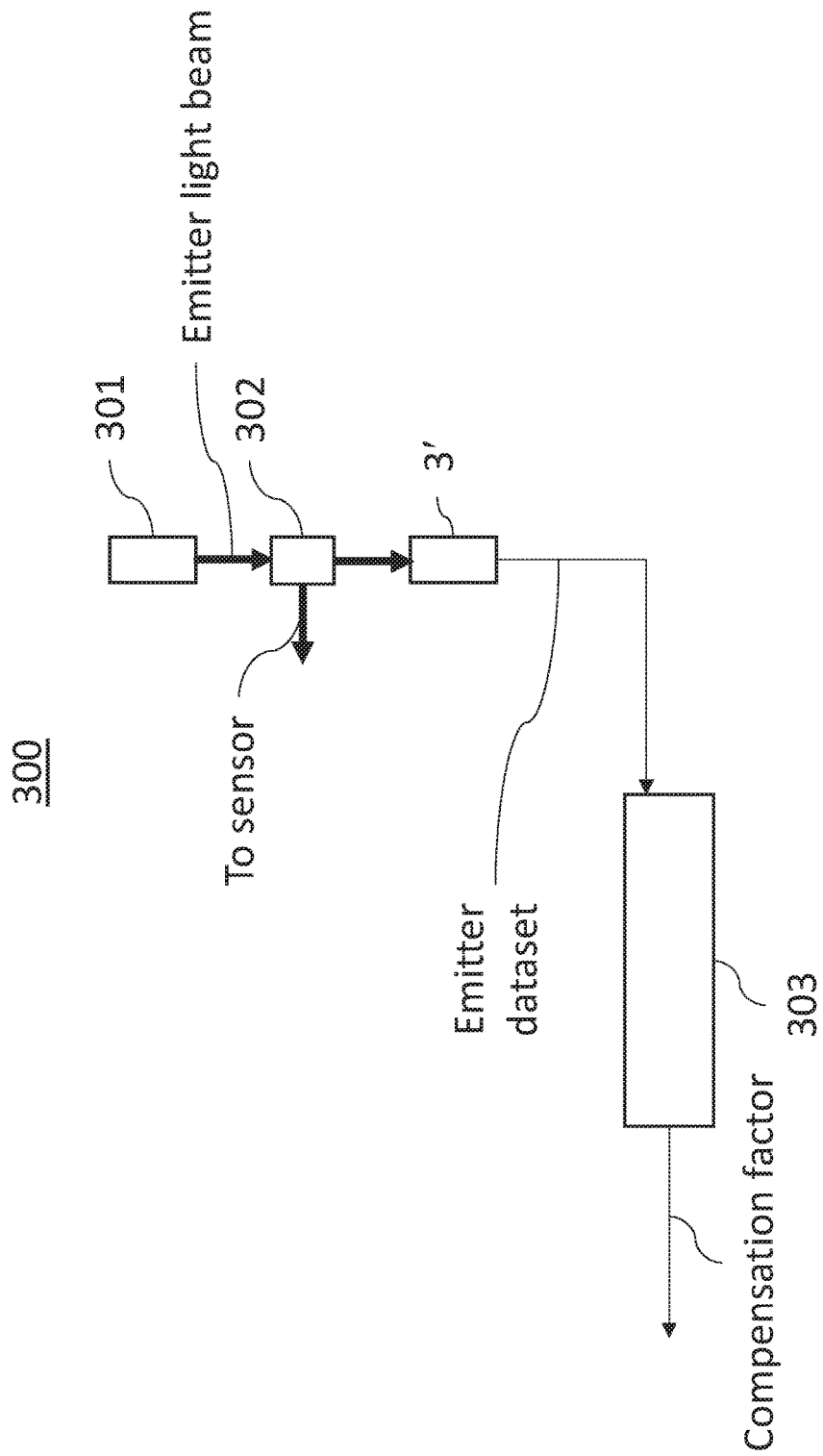
FIG. 14A is a schematic diagram of a wavelength-corrective light source for wavelength compensation.

FIG. 14A is a schematic diagram of a wavelength-corrective light source 300 for use with an optical sensor. Wavelength-corrective light source 300 includes emitter 301 configured to emit an emitter light beam characterized by an emitter wavelength spectrum having an emitter centroid wavelength with an emitter centroid wavelength operational sensitivity. Emitter 301 may be a broadband light source including at least one of an SLD, an REDSLS, an LED, and a supercontinuum fiber, and the wavelength spectrum may have a FWHM bandwidth of about 5 nm or greater. The emitter centroid wavelength operational sensitivity may include at least one of an emitter centroid wavelength thermal sensitivity, an emitter centroid wavelength drive current sensitivity, and an emitter centroid wavelength ionizing radiation sensitivity.

Further in reference to FIG. 14A, wavelength-corrective light source 300 also includes an emission spectrometer. In this embodiment, the emission spectrometer is also the calibration spectrometer 3', described hereinabove, including a spectrometric photodetector and at least one acousto-optic tunable filter (AOTF). However, in other embodiments, the emission spectrometer may be separate from the calibration spectrometer. Wavelength-corrective light source 300 also includes a splitter 302, which splits the emitter light beam into at least two emitter light beams, one directed to the sensor and the other directed to spectrometer 3'. Alternatively, the emitter light beam may be directed wholly to the sensor, and a returned emitter light beam from the sensor may be directed to spectrometer 3'.

The at least one AOTF is configured to receive the emitter light beam. Spectrometer 3' is configured to apply a plurality of emitter spectral selection factors, which include a plurality of AOTF drive frequencies, to spectrally resolve the emitter light beam. Spectrometer 3' is further configured to detect a plurality of emitter spectral power readings from the spectrally resolved emitter light beam (transmitted light beam) corresponding to the plurality of emitter spectral selection factors, which in turn correspond to respective AOTF drive frequencies. Spectrometer 3' is further configured to deliver an emitter dataset for associating the emitter spectral power readings with the emitter spectral selection factors.

Wavelength-corrective light source 300 in FIG. 14A further includes an emitter centroid wavelength correction circuit 303 configured to receive the emitter dataset and to act on the plurality of powers of the transmitted light beam to correct for the emitter centroid wavelength operational sensitivity. In the embodiment wavelength-corrective light source 300, the correction is performed by delivering a compensation factor, based on the emitter dataset, for compensating for a discrepancy, due to the centroid wavelength operational sensitivity, between the emitter centroid wavelength and a predetermined wavelength.

One example compensation factor is a ratio of the emitter centroid wavelength to the predetermined wavelength. This ratio compensation factor may be multiplied by an uncompensated output of a sensor, such as a FOG, that uses wavelength-corrective light source 300 to deliver a compensated output. In view of the description provided herein, a person of ordinary skill in the art would be enabled to cause compensation in embodiments in a variety of other manners.

Figure 14B:
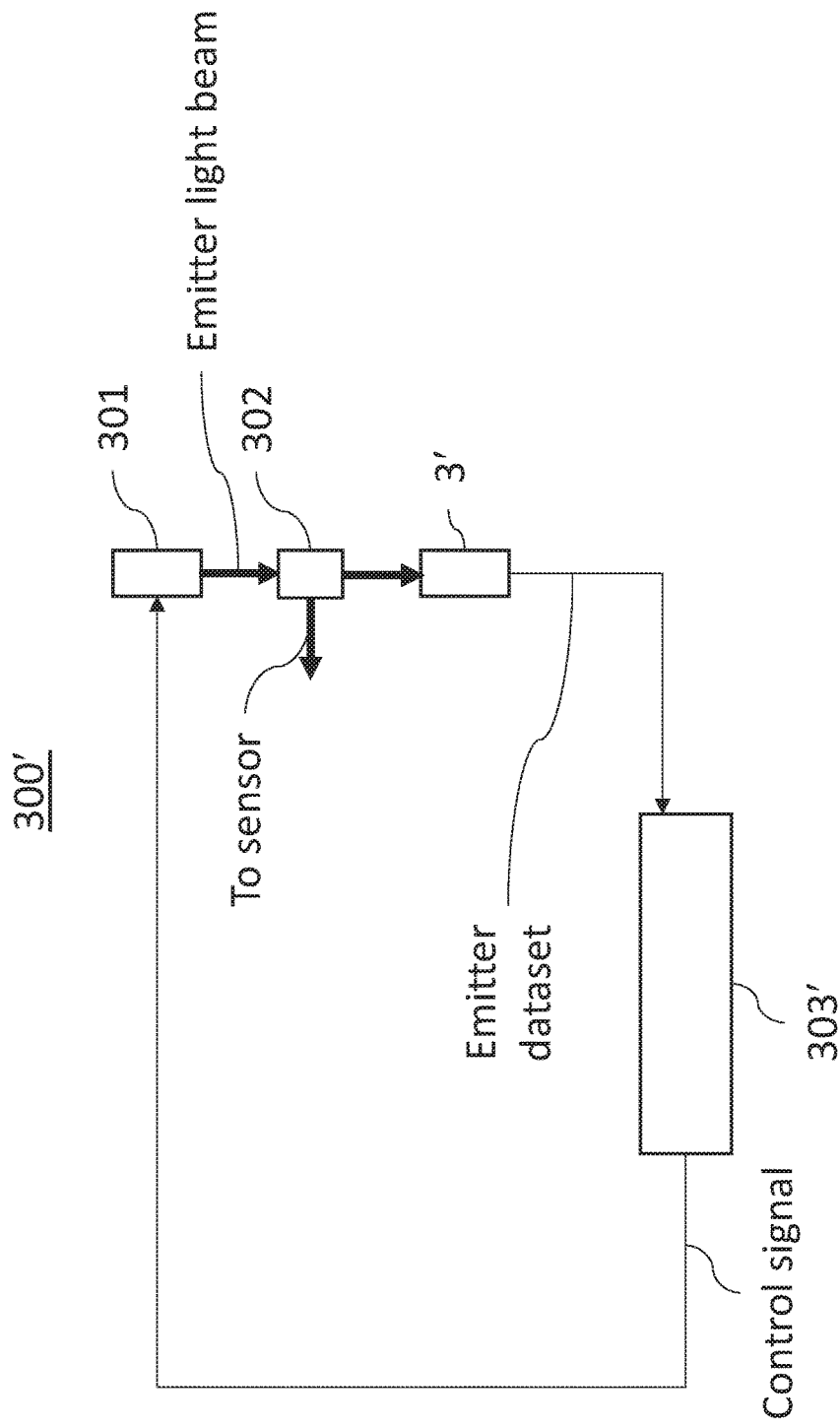
FIG. 14B is a schematic diagram of a wavelength-corrective light source for wavelength control.

FIG. 14B is a schematic diagram of a wavelength-corrective light source 300' that instead includes an emitter centroid wavelength correction circuit 303' configured to receive the emitter dataset and to act to correct for the emitter centroid wavelength operational sensitivity by controlling the emitter centroid wavelength.

In accordance with various embodiments disclosed herein, and in view of the disclosure provided herein, the emitter centroid wavelength may be controlled by means known in the art that can include at least one of a thermal conditioning device, such as a Peltier cell, configured to receive the control signal and to adjust the temperature of emitter 301 to control the emitter centroid wavelength; an electrical current conditioning device configured to receive the control signal and adjust the drive current supplied to emitter 301 to control the emitter centroid wavelength; and an external mirror conditioning device configured to receive the control signal and adjust an external mirror reflectivity or position. In view of the description provided herein, a person of ordinary skill in the art would be enabled to cause control in embodiments in a variety of other manners.

Figure 15A:
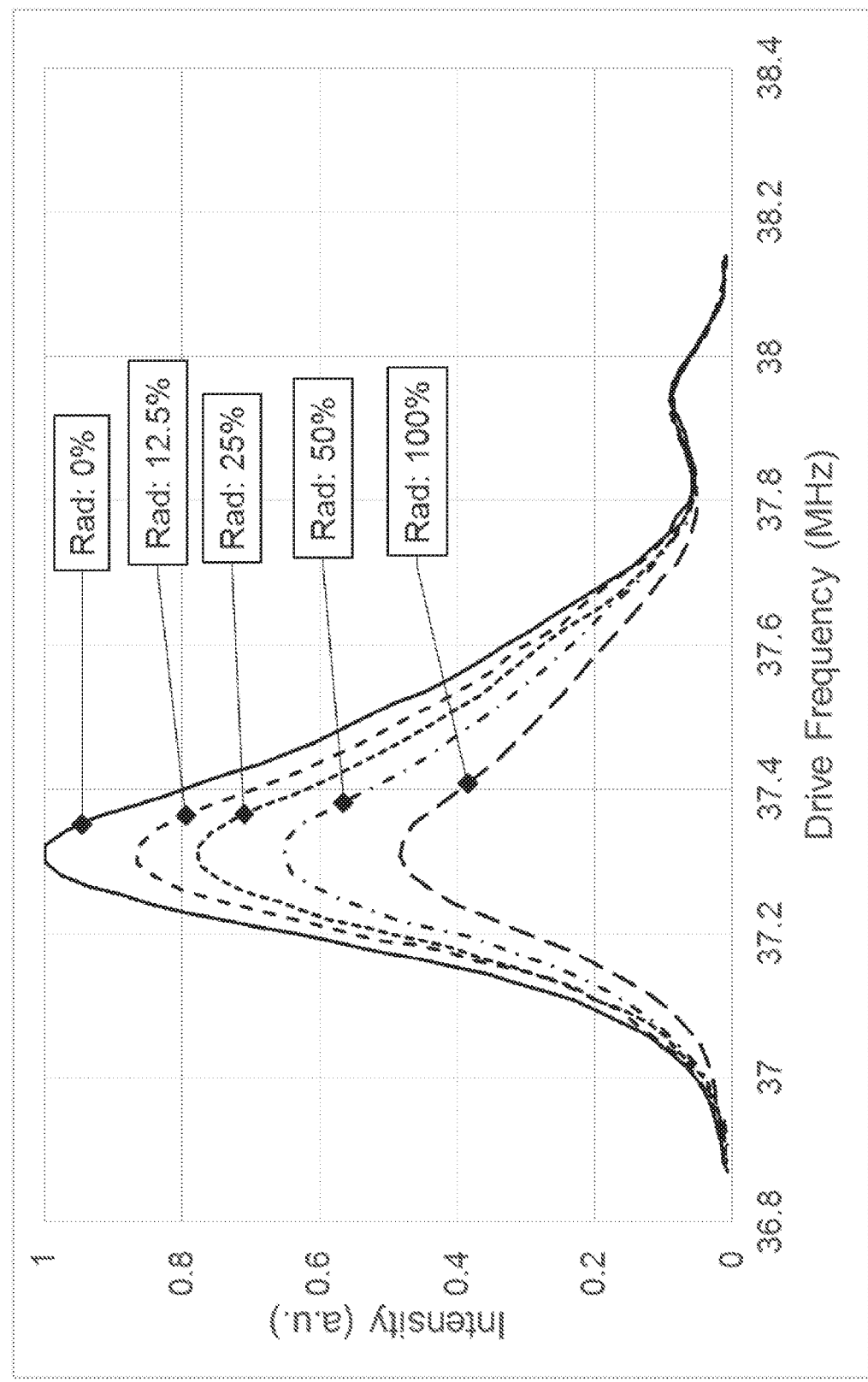
FIG. 15A is a graph that shows an exemplary emitter dataset of FIGS. 14A and 14B in terms of a plurality of spectral selection factors comprised of a plurality of AOTF drive frequencies.

FIG. 15A is a graph that shows an exemplary emitter dataset of FIGS. 14A and 14B in terms of a plurality of spectral selection factors comprised of a plurality of AOTF drive frequencies.

FIG. 15B is a table of exemplary compensation factors delivered by wavelength-corrective light source 300 derived from the spectra of FIG. 15A upon application of the 25° C. tuning relation shown in FIG. 9A to relate drive frequencies to optical wavelengths, as shown in FIG. 1. The compensation factors are calculated from the ratio of the emitter centroid wavelength, at a given percentage of radiation dose, to the emitter centroid wavelength at zero dose. Alternatively, wavelength-corrective light source 300' may control emitter 301 to maintain the emitter centroid wavelength at a constant value, for example the emitter centroid wavelength at zero dose.

Figure 16A:
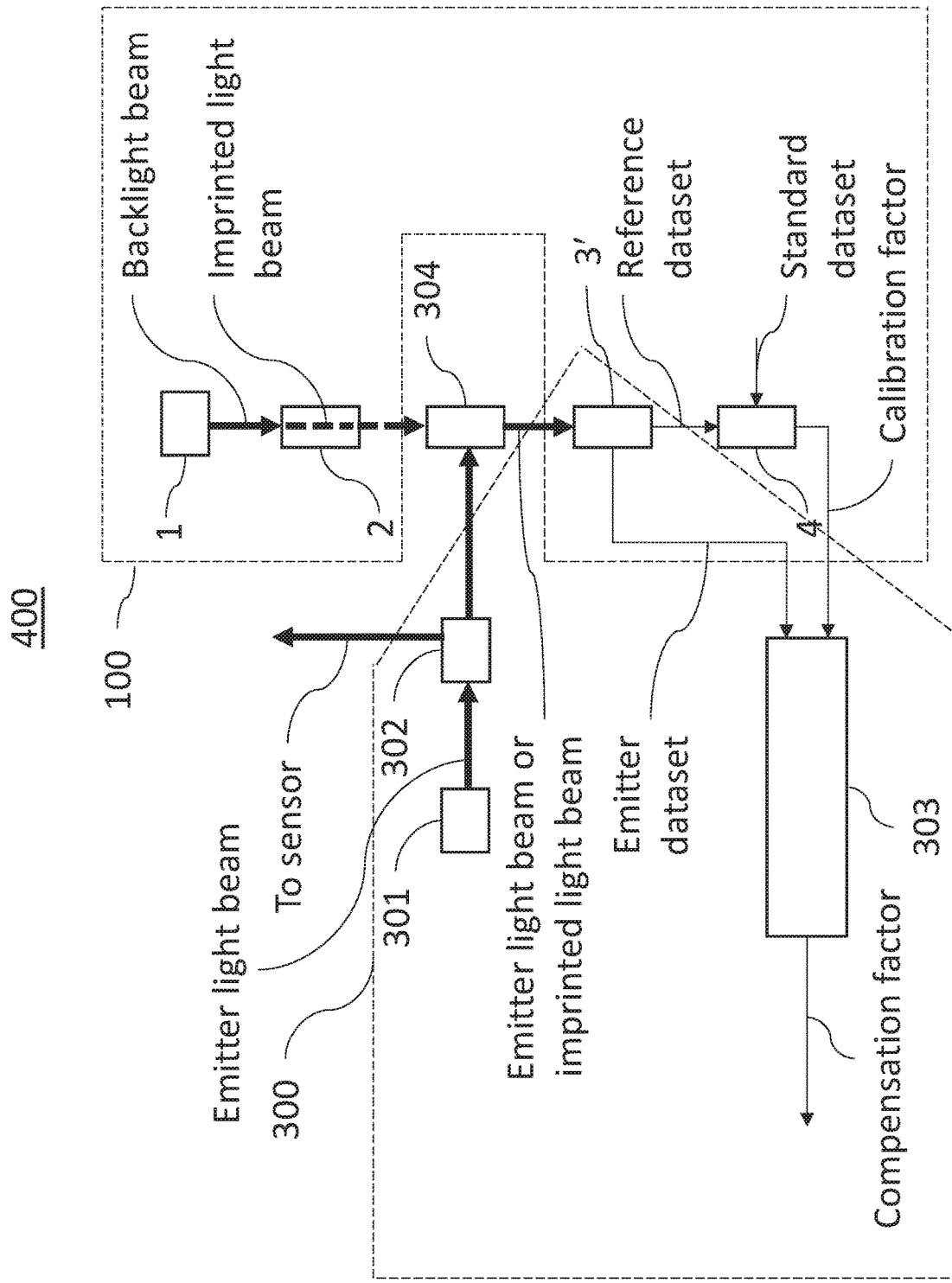
FIG. 16A is a schematic diagram of a calibrated wavelength-corrective light source for wavelength compensation.

FIG. 16A is a schematic diagram of a calibrated wavelength-corrective light source 400. Calibrated wavelength-corrective light source 400 includes wavelength-corrective light source 300. Calibrated wavelength-corrective light source 400 further includes grouped molecular absorption line wavelength calibration apparatus 100 with spectrometer 3'. Calibrated wavelength-corrective light source 400 further includes a router 304. Router 304 may be configured to selectively deliver the emitter light beam and the imprinted light beam to spectrometer 3'. For example, in a first state, the router may deliver the imprinted light beam to the spectrometer for calibration of the spectrometer. In a second state, the router may deliver the emitter light beam to the spectrometer for spectroscopy of the emitter light beam. Selection of the state of the router may be based on which function the spectrometer is requested to perform, such as calibration or spectroscopy. Emitter centroid wavelength correction circuit 303 may be further configured to receive and apply the calibration factor to calibrate the plurality of emitter spectral selection factors relative to the plurality of optical wavelengths.

Figure 16B:
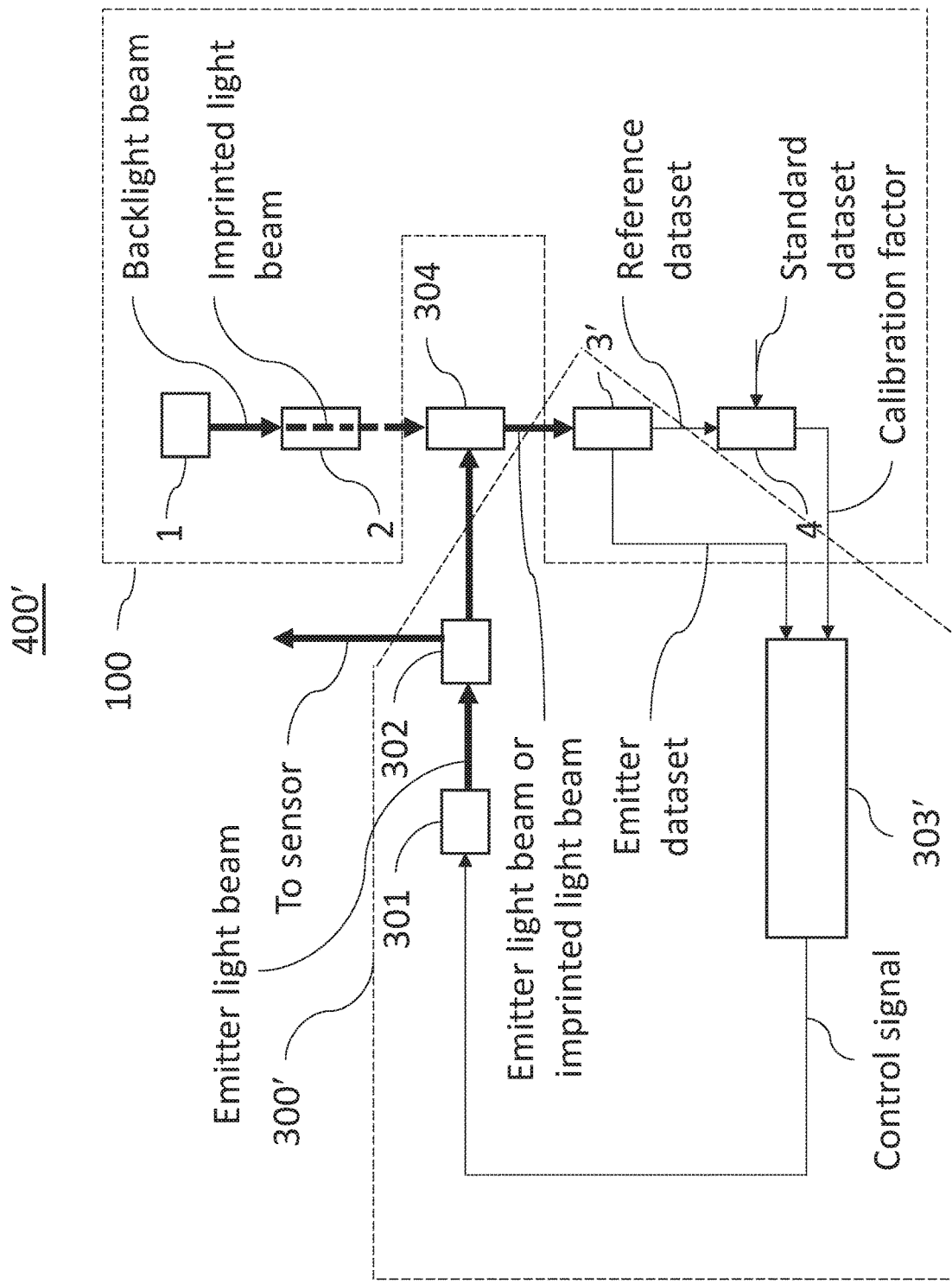
FIG. 16B is a schematic diagram of a calibrated wavelength-corrective light source for wavelength control.

FIG. 16B is a schematic diagram of a calibrated wavelength-corrective light source 400'. Calibrated wavelength-corrective light source 400' includes wavelength-corrective light source 300'. Calibrated wavelength-corrective light source 400' further includes grouped molecular absorption line wavelength calibration apparatus 100 with spectrometer 3'. Calibrated wavelength-corrective light source 400' further includes router 304. Router 304 may be configured to selectively deliver the emitter light beam and the imprinted light beam to spectrometer 3'. Emitter centroid wavelength correction circuit 303' may be further configured to receive and apply the calibration factor to calibrate the plurality of emitter spectral selection factors relative to the plurality of optical wavelengths.

Figure 17:
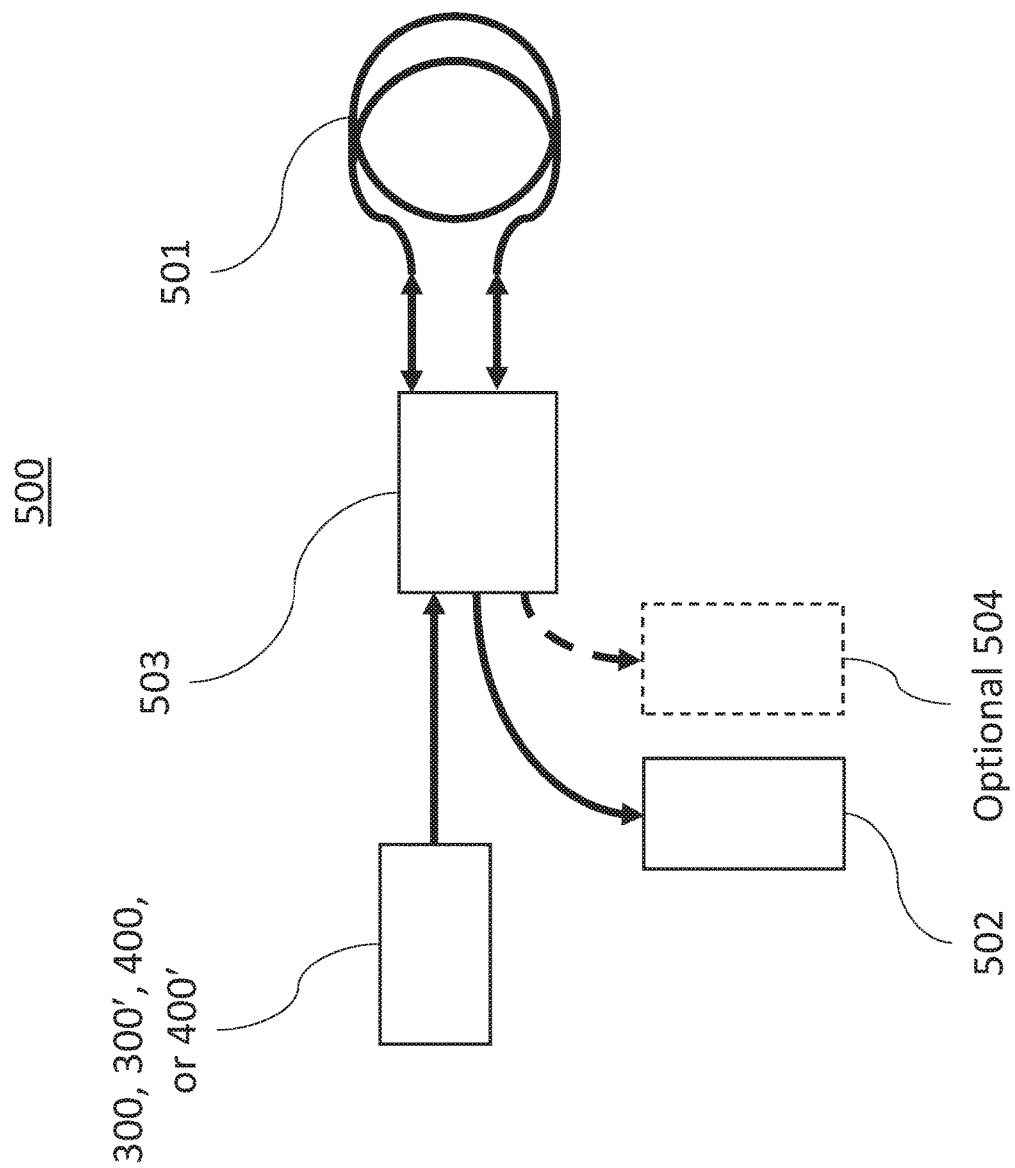
FIG. 17 is a schematic diagram of a fiber-optic gyroscope (FOG) comprising at least one wavelength-corrective light source of FIGS. 14A, 14B, 16A, and 16B.

FIG. 17 is a schematic diagram of a FOG 500 that comprises wavelength-corrective light source 300 or 300', or calibrated wavelength-corrective light source 400 or 400'. FOG 500 also comprises a coil of optical fiber 501, a rate photodetector 502, and a phase modulator coupler optical circuit 503 configured to phase modulate the light from the light source and couple the light from the light source into coil of optical fiber 501 and further into rate detector 502. FOG 500 may further include an optional RIN detector 504. Alternatively, FOG 500 may be configured to deliver a returned emitter beam to wavelength-corrective light source 300 or 300', or calibrated wavelength-corrective light source 400 or 400', for delivery to spectrometer 3' for centroid wavelength correction.

Figure 18:
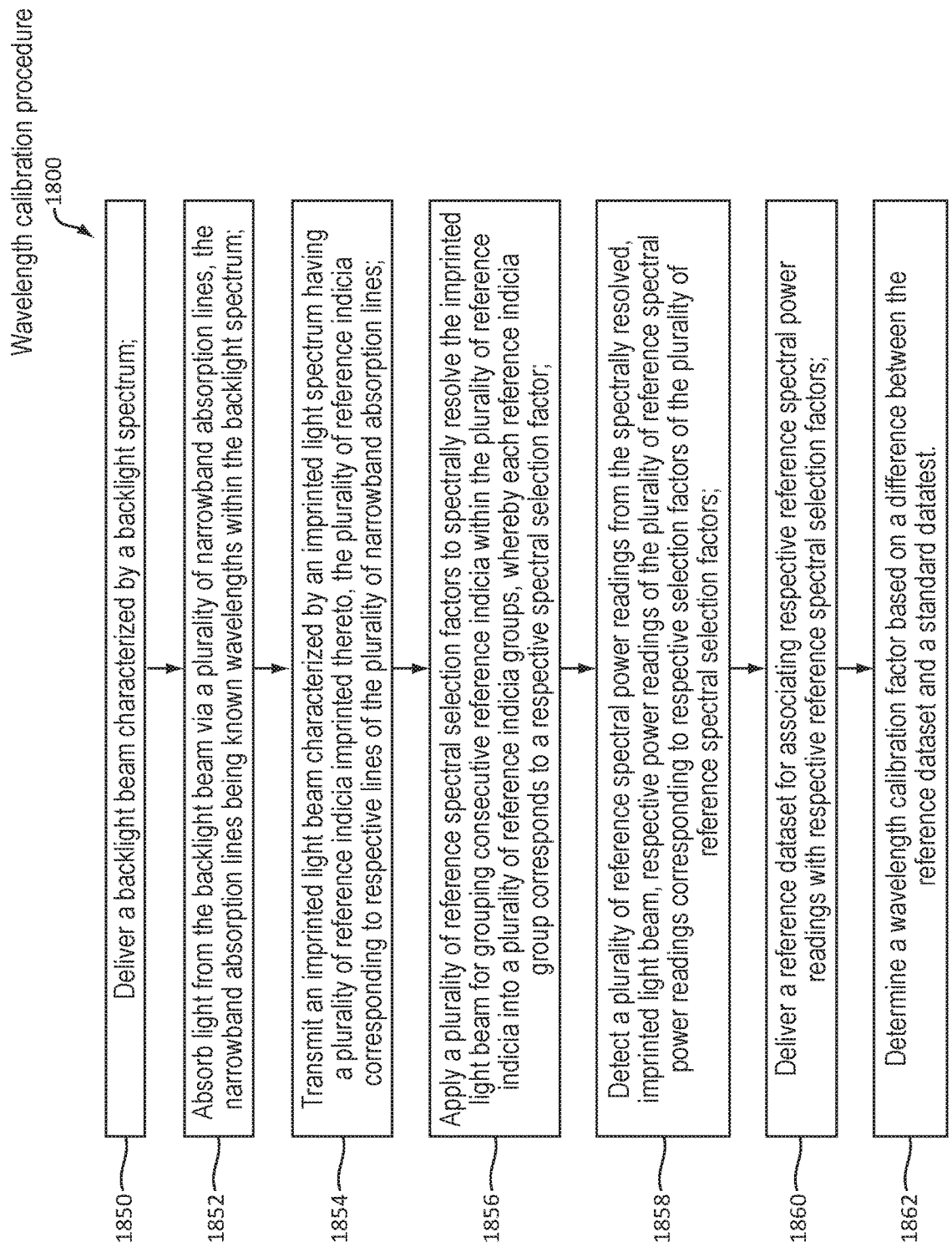
FIG. 18 is a flow diagram illustrating an embodiment procedure for wavelength calibration.

FIG. 18 is a flow diagram illustrating an embodiment procedure 1800 for wavelength calibration. At 1850, a backlight beam characterized by a backlight spectrum is delivered. At 1852, light from the backlight beam is absorbed via a plurality of narrowband absorption lines, the narrowband absorption lines being known wavelength within the light spectrum within the backlight spectrum. At 1854, an imprinted light beam, characterized by an imprinted light spectrum having a plurality of reference indicia imprinted thereto, is transmitted. The plurality of reference indicia corresponds to respective lines of the plurality of narrowband absorption lines.

At 1856, a plurality of reference spectral selection factors is applied to spectrally resolve the imprinted light beam for grouping consecutive (spectrally adjacent) reference indicia within the plurality of reference indicia into a plurality of reference indicia groups. By this means, each reference indicia group corresponds to a respective spectral selection factor. At 1858, a plurality of reference spectral power readings is detected from the spectrally resolved, imprinted light beam. Respective power readings of the plurality of reference spectral power readings correspond to respective selection factors of the plurality of reference spectral selection factors. At 1860, a reference data set is delivered for associating respective reference spectral power readings with respective reference spectral selection factors. At 1862, a wavelength calibration factor is determined based on a difference between the reference data set and a standard data set. It will be understood that performance of the wavelength calibration procedure 1800 may be facilitated by use of the embodiment group molecular absorption line wavelength calibration apparatus 100 in FIG. 2, or by variations thereof, for example.

Figure 19:
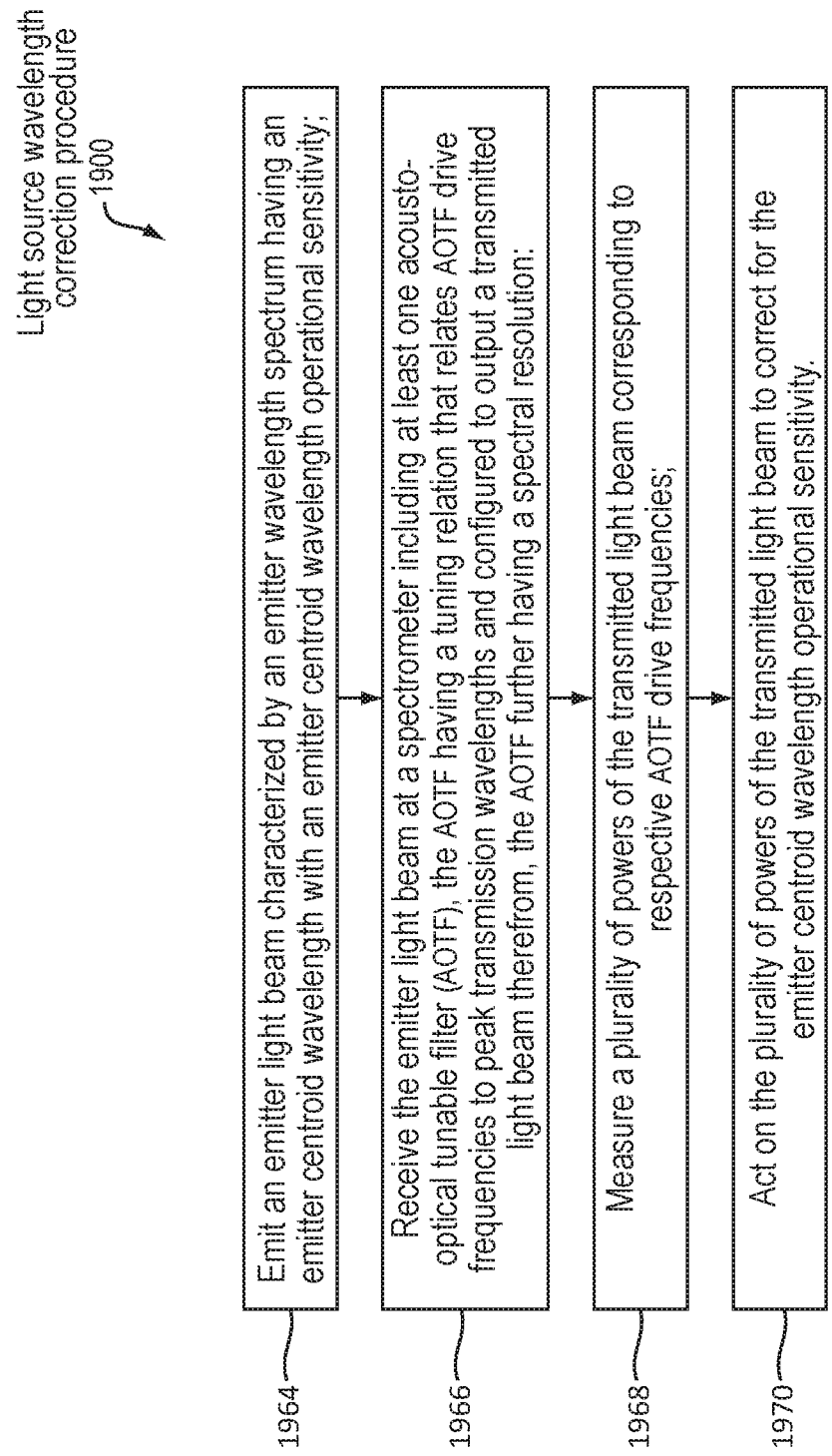
FIG. 19 is a flow diagram illustrating an embodiment procedure 1900 for a light source wavelength correction.

FIG. 19 is a flow diagram illustrating an embodiment light source wavelength correction procedure 1900. At 1964, an emitter light beam characterized by an emitter wavelength spectrum is emitted. The emitter wavelength spectrum has an emitter centroid wavelength with an emitter centroid wavelength operational sensitivity. At 1966, the emitter light beam is received at a spectrometer including at least one AOTF, where the AOTF has a tuning relation that relates AOTF drive frequencies to peak transmission wavelengths. The AOTF is configured to output a transmitted light beam therefrom, and the AOTF further has a spectral resolution.

At 1968, a plurality of powers of the transmitted light beam are measured, where the plurality of powers corresponds to respective AOTF drive frequencies. At 1970, the plurality of powers of the transmitted light beam is acted upon to correct for the emitter centroid wavelength operational sensitivity. It should be understood that the wavelength corrective light source 300 illustrated in FIG. 14A, or the wavelength corrective light source 300' illustrated in FIG. 14B, or variations thereof, may be used to facilitate performance of the procedure 1900.

The invention has been described in detail with particular reference to certain preferred embodiments thereof, but it will be understood that variations and modifications can be effected within the scope of the invention as described above by a person of ordinary skill in the art without departing from the scope of the invention.

While this invention has been particularly shown and described with references to example embodiments thereof, it will be understood by those skilled in the art that various changes in form and details may be made therein without departing from the scope of the invention encompassed by the appended claims.

The teachings of all patents, published applications and references cited herein are incorporated by reference in their entirety.

What is claimed is:

1. A wavelength calibration apparatus comprising:
    a backlight source configured to deliver a backlight beam characterized by a backlight spectrum;
    at least one gas reference cell configured to absorb light from the backlight beam via a plurality of narrowband absorption lines of the gas reference cell, the narrowband absorption lines being known wavelengths within the backlight spectrum, and the at least one gas reference cell further configured to transmit an imprinted light beam characterized by an imprinted light spectrum having a corresponding plurality of reference indicia imprinted thereto;
    a calibration spectrometer configured to:
    (i) receive the transmitted imprinted light beam from the at least one gas reference cell and to apply a plurality of reference spectral selection factors to spectrally resolve the imprinted light beam for grouping reference indicia within the plurality of reference indicia into a plurality of reference indicia groups, whereby each reference indicia group corresponds to a respective spectral selection factor,
    (ii) detect a plurality of reference spectral power readings from the spectrally resolved, imprinted light beam, respective power readings of the plurality of reference spectral power readings corresponding to respective selection factors of the plurality of reference spectral selection factors, and
    (iii) to deliver a reference dataset for associating the reference spectral power readings with the reference spectral selection factors; and
    a wavelength calibrator configured to determine a wavelength calibration factor based on a difference between the reference dataset and a standard dataset.

2. The wavelength calibration apparatus of claim 1, wherein the calibration spectrometer comprises at least one acousto-optic tunable filter (AOTF) having a tuning relation that relates AOTF drive frequencies to peak transmission wavelengths output therefrom, the calibration spectrometer having a spectral resolution and further including a spectrometric photodetector having at least one photodiode.

3. The wavelength calibration apparatus of claim 2, wherein the tuning relation of the at least one AOTF includes a tuning relation operational sensitivity having at least one of a tuning relation thermal sensitivity and a tuning relation ionizing radiation sensitivity.

4. The wavelength calibration apparatus of claim 2, wherein the at least one AOTF is optically coupled to the at least one photodiode by a free space mechanism, a fiber optic mechanism, or a combination thereof.

5. The wavelength calibration apparatus of claim 2, wherein the plurality of spectral selection factors includes a plurality of AOTF drive frequencies.

6. The wavelength calibration apparatus of claim 5, wherein the plurality of AOTF drive frequencies is applied to the AOTF via a swept drive sequence across a frequency range.

7. The wavelength calibration apparatus of claim 5, wherein the plurality of AOTF drive frequencies is applied to the AOTF via an arbitrary or random sequence.

8. The wavelength calibration apparatus of claim 2, wherein a combination of the spectral resolution of the AOTF and the plurality of AOTF drive frequencies determines the plurality of reference indicia groups.

9. The wavelength calibration apparatus of claim 1, wherein the calibration spectrometer comprises a dispersive element and a spectrometric photodetector having a plurality of photodiodes, the dispersive element configured to spectrally distribute the imprinted light beam to the spectrometric photodetector.

10. The wavelength calibration apparatus of claim 9, wherein the plurality of photodiodes constitute a photodiode array and the dispersive element is a diffraction grating or prism.

11. The wavelength calibration apparatus of claim 10, wherein the plurality of spectral selection factors includes a plurality of dispersion angles and the combination of a pitch of the photodiode array and an angular dispersion of the dispersive element determines the plurality of reference indicia groups.

12. The wavelength calibration apparatus of claim 1, wherein the calibration spectrometer comprises a plurality of bandpass filters and a spectrometric photodetector having a plurality of photodiodes, each bandpass filter in optical communication with a respective photodiode.

13. The wavelength calibration apparatus of claim 12, wherein the plurality of spectral selection factors includes a plurality of filter passbands and the plurality of filter passbands determines the plurality of reference indicia groups.

14. The wavelength calibration apparatus of claim 1, wherein the wavelength calibrator includes at least one of a microprocessor, an application-specific integrated circuit (ASIC), and a field-programmable gate array (FPGA).

15. The wavelength calibration apparatus of claim 1, wherein the difference between the reference dataset and the standard dataset is a function of a difference between the correspondence of the plurality of reference indicia groups to the reference spectral selection factors and a correspondence of a plurality of standard indicia groups to a plurality of standard spectral selection factors.

16. The wavelength calibration apparatus of claim 1, wherein the light source includes an emitter that includes at least one of a superluminescent diode (SLD), a rare-earth-doped superluminescent source (REDSLS), a light emitting diode (LED), and a supercontinuum fiber.

17. The wavelength calibration apparatus of claim 1, wherein the light source includes an emitter and a flattening filter, the flattening filter configured to receive an unconditioned light beam characterized by an unconditioned spectrum from the emitter to flatten the unconditioned spectrum and to transmit the backlight beam.

18. The wavelength calibration apparatus of claim 1, wherein the light source is configured to deliver the backlight beam to the gas reference cell by at least one of a free space mechanism, a fiber optic mechanism, or a combination thereof.

19. The wavelength calibration apparatus of claim 18, wherein the free space mechanism includes a lens coupling.

20. The wavelength calibration apparatus of claim 18, wherein the fiber optic mechanism includes a fiber pigtail.

21. The wavelength calibration apparatus of claim 1, wherein the at least one gas reference cell includes at least one of a tube, a hollow optical fiber, and an integrated waveguide coupled chamber.

22. The wavelength calibration apparatus of claim 1, wherein the at least one gas reference cell is filled with at least one gas, the at least one gas including at least one of acetylene, hydrogen cyanide, carbon monoxide having carbon 12 isotope, carbon monoxide having carbon 13 isotope, hydrogen fluoride, water vapor, methane, ammonia, hydrogen chloride, carbon dioxide, hydrogen sulphide, nitrogen, argon, and nitrogen dioxide.

23. The wavelength calibration apparatus of claim 1, wherein the at least one gas reference cell is filled with a mixture of different gases.

24. The wavelength calibration apparatus of claim 1, wherein the at least one gas reference cell includes a plurality of gas reference cells, each gas reference cell filled with a different gas.

25. The wavelength calibration apparatus of claim 24, wherein the gas reference cells are optically coupled together, by a free space mechanism, a fiber optic mechanism, or a combination thereof, such that the imprinted light beam results from the combination of a plurality of constituent imprinted light beams corresponding to the plurality of gas reference cells.

26. The wavelength calibration apparatus of claim 1, wherein the at least one gas reference cell is configured to deliver the imprinted light beam to the calibration spectrometer by at least one of a free space mechanism, a fiber optic mechanism, or a combination thereof.

27. The wavelength calibration apparatus of claim 26, wherein the free space mechanism includes a lens coupling.

28. The wavelength calibration apparatus of claim 26, wherein the fiber optic mechanism includes a fiber pigtail.

29. A wavelength-corrective light source comprising:
the wavelength calibration apparatus of claim 1;
an emitter configured to emit an emitter light beam characterized by an emitter wavelength spectrum having an emitter centroid wavelength with an emitter centroid wavelength operational sensitivity;
an emission spectrometer including at least one acousto-optic tunable filter (AOTF) configured to receive the emitter light beam and to output a transmitted light beam therefrom, the emission spectrometer further including a spectrometric photodetector having at least one photodiode configured to receive the transmitted light beam and to measure a plurality of powers of the transmitted light beam corresponding to respective AOTF drive frequencies; and
an emitter centroid wavelength correction circuit configured to act on the plurality of powers of the transmitted light beam to correct for the emitter centroid wavelength operational sensitivity.

30. The wavelength-corrective light source of claim 29, wherein the emitter centroid wavelength correction circuit is configured to correct for the emitter centroid wavelength operational sensitivity by compensating for the emitter centroid wavelength operational sensitivity.

31. The wavelength-corrective light source of claim 29, wherein the emitter centroid wavelength correction circuit is configured to correct for the emitter centroid wavelength operational sensitivity by controlling the emitter centroid wavelength.

32. The wavelength-corrective light source of claim 29, wherein the emission spectrometer is further configured to apply a plurality of emitter spectral selection factors, which include a plurality of AOTF drive frequencies, to spectrally resolve the emitter light beam.

33. The wavelength-corrective light source of claim 32, wherein the plurality of AOTF drive frequencies are applied to the AOTF via a swept drive sequence across a frequency range.

34. The wavelength-corrective light source of claim 32, wherein the plurality of AOTF drive frequencies are applied to the AOTF via an arbitrary or random sequence.

35. The wavelength-corrective light source of claim 29, wherein the emission spectrometer is further configured to detect a plurality of emitter spectral power readings from the spectrally resolved emitter light beam corresponding to the plurality of emitter spectral selection factors.

36. The wavelength-corrective light source of claim 29, wherein the emission spectrometer is further configured to deliver an emitter dataset for associating the emitter spectral power readings with the emitter spectral selection factors.

37. The wavelength-corrective light source of claim 29, wherein the calibration spectrometer is also the emission spectrometer, the wavelength-corrective light source further comprising a router configured to selectively deliver the emitter light beam and the imprinted light beam to the emission spectrometer.

38. The wavelength-corrective light source of claim 29, wherein the emitter centroid wavelength correction circuit is further configured to receive and apply the calibration factor to calibrate the plurality of emitter spectral selection factors relative to the plurality of optical wavelengths.

39. The wavelength-corrective light source of claim 29, wherein the emitter centroid wavelength operational sensitivity includes at least one of an emitter centroid wavelength thermal sensitivity, an emitter centroid wavelength drive current sensitivity, and an emitter centroid wavelength ionizing radiation sensitivity.

40. The wavelength-corrective light source of claim 29, wherein the at least one AOTF is optically coupled to the at least one photodiode by a free space mechanism, a fiber optic mechanism, or a combination thereof.

41. The wavelength-corrective light source of claim 29, wherein the emitter comprises a broadband light source including at least one of an SLD, an REDSLS, an LED, and a supercontinuum fiber.

42. A fiber-optic gyroscope (FOG) comprising:
the wavelength-corrective light source of claim 29;
at least one coil of optical fiber; and
a phase modulator coupler optical circuit configured to phase modulate the emitter light from the light source and to couple the emitter light from the light source into the coil of optical fiber.

43. The FOG of claim 42, wherein the emission spectrometer of the wavelength-corrective light source is also the calibration spectrometer of the wavelength calibration apparatus.

44. The FOG of claim 42, further comprising at least one of a rate photodetector, wherein the phase modulator coupler optical circuit is further configured to couple the emitter light from the coil of optical fiber into the at least one rate photodetector.

45. The FOG of claim 42, further including at least one relative intensity noise (RIN) photodetector.

46. A wavelength-corrective light source comprising:
an emitter configured to emit an emitter light beam characterized by an emitter wavelength spectrum having an emitter centroid wavelength with an emitter centroid wavelength operational sensitivity;
an emission spectrometer including at least one acousto-optic tunable filter (AOTF) configured to receive the emitter light beam and to output a transmitted light beam therefrom, the emission spectrometer further including a spectrometric photodetector having at least one photodiode configured to receive the transmitted light beam and to measure a plurality of powers of the transmitted light beam corresponding to respective AOTF drive frequencies; and
an emitter centroid wavelength correction circuit configured to act on the plurality of powers of the transmitted light beam to correct for the emitter centroid wavelength operational sensitivity.

47. A method of wavelength calibration, the method comprising:
delivering a backlight beam characterized by a backlight spectrum;
absorbing light from the backlight beam via a plurality of narrowband absorption lines, the narrowband absorption lines being known wavelengths within the backlight spectrum;
transmitting an imprinted light beam characterized by an imprinted light spectrum having a plurality of reference indicia imprinted thereto, the plurality of reference indicia corresponding to respective lines of the plurality of narrowband absorption lines;
applying a plurality of reference spectral selection factors to spectrally resolve the imprinted light beam for grouping consecutive reference indicia within the plurality of reference indicia into a plurality of reference indicia groups, whereby each reference indicia group corresponds to a respective spectral selection factor;
detecting a plurality of reference spectral power readings from the spectrally resolved, imprinted light beam, respective power readings of the plurality of reference spectral power readings corresponding to respective selection factors of the plurality of reference spectral selection factors;
delivering a reference dataset for associating respective reference spectral power readings with respective reference spectral selection factors; and
determining a wavelength calibration factor based on a difference between the reference dataset and a standard dataset.

48. A method of correcting a light source wavelength, the method comprising:
emitting an emitter light beam characterized by an emitter wavelength spectrum having an emitter centroid wavelength with an emitter centroid wavelength operational sensitivity;
receiving the emitter light beam at a spectrometer including at least one acousto-optic tunable filter (AOTF), the AOTF having a tuning relation that relates AOTF drive frequencies to peak transmission wavelengths and configured to output a transmitted light beam therefrom, the AOTF further having a spectral resolution;
measuring a plurality of powers of the transmitted light beam corresponding to respective AOTF drive frequencies; and
acting on the plurality of powers of the transmitted light beam to correct for the emitter centroid wavelength operational sensitivity.

* * * * *